US012775398B2

(12) United States Patent
Eun et al.

(10) Patent No.: US 12,775,398 B2
(45) Date of Patent: Oct. 27, 2026

(54) STORAGE DEVICES INCLUDING NONVOLATILE MEMORY AND RELATED METHODS

(71) Applicant: Samsung Electronics Co., Ltd., Suwon-si (KR)

(72) Inventors: Heeseok Eun, Suwon-si (KR); Jinwook Lee, Suwon-si (KR); Bongsoon Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 19/086,429

(22) Filed: Mar. 21, 2025

(65) Prior Publication Data

US 2025/0217048 A1 Jul. 3, 2025

Related U.S. Application Data

(63) Continuation of application No. 18/314,978, filed on May 10, 2023, now Pat. No. 12,282,664.

(30) Foreign Application Priority Data

Aug. 30, 2022 (KR) ........................ 10-2022-0109014

(51) Int. Cl.
*G06F 3/06* (2006.01)

(52) U.S. Cl.
CPC ............ *G06F 3/0619* (2013.01); *G06F 3/064* (2013.01); *G06F 3/0679* (2013.01)

(58) Field of Classification Search
CPC ....... G06F 3/0619; G06F 3/064; G06F 3/0679
See application file for complete search history.

(56) References Cited

U.S. PATENT DOCUMENTS

| | | | |
|---|---|---|---|
| 7,679,133 | B2 | 3/2010 | Son et al. |
| 8,553,466 | B2 | 10/2013 | Han et al. |

(Continued)

FOREIGN PATENT DOCUMENTS

| | | |
|---|---|---|
| KR | 10-2022-0054096 A | 5/2022 |
| KR | 10-2022-0106307 A | 7/2022 |

OTHER PUBLICATIONS

Extended European Search Report corresponding to European Application No. 23192345.9 (8 pages) (mailed Dec. 19, 2023).

(Continued)

*Primary Examiner* — Ryan Bertram
(74) *Attorney, Agent, or Firm* — Wolf, Greenfield & Sacks, P.C.

(57) ABSTRACT

A storage device includes: nonvolatile memory devices including first and second nonvolatile memory devices; a storage controller which receives data blocks from a host, generates a first parity block by performing a first XOR operation, and distributes the data blocks and first parity block to respective nonvolatile memory devices; and a data bus for transferring signals between the nonvolatile memory devices and the storage controller. The storage controller receives a new data block from the host and provides the new data block to the second nonvolatile memory device. The first nonvolatile memory device provides the first data block to the second nonvolatile memory device without using the storage controller. The second nonvolatile memory device generates a new parity block by performing a second XOR operation on the new data block, the first data block, and the first parity block without the first nonvolatile memory device performing an XOR operation.

20 Claims, 25 Drawing Sheets

(56) References Cited

U.S. PATENT DOCUMENTS

| | | | | |
|---|---|---|---|---|
| 8,559,235 | B2 | 10/2013 | Nam et al. | |
| 8,654,587 | B2 | 2/2014 | Yoon et al. | |
| 9,836,224 | B2 | 12/2017 | Seo et al. | |
| 10,019,315 | B2 | 7/2018 | Kato | |
| 10,067,882 | B2 | 9/2018 | Imazaki et al. | |
| 10,102,070 | B2 | 10/2018 | Nomura et al. | |
| 10,133,662 | B2 | 11/2018 | Peterson et al. | |
| 10,725,865 | B2 | 7/2020 | Okada et al. | |
| 11,093,329 | B1 | 8/2021 | Kotzur et al. | |
| 11,237,977 | B2 | 2/2022 | Choi et al. | |
| 2008/0082730 | A1* | 4/2008 | Kim | G06F 11/1068 711/E12.008 |
| 2011/0126066 | A1* | 5/2011 | Jo | G06F 13/28 711/E12.002 |
| 2011/0233648 | A1 | 9/2011 | Seol et al. | |
| 2017/0322845 | A1 | 11/2017 | Nomura et al. | |
| 2019/0332470 | A1 | 10/2019 | Gupta et al. | |
| 2020/0242024 | A1* | 7/2020 | Du | G11C 11/4074 |
| 2020/0319819 | A1 | 10/2020 | Nelogal et al. | |
| 2020/0334103 | A1 | 10/2020 | Miyoshi et al. | |
| 2021/0096951 | A1 | 4/2021 | Kotzur et al. | |
| 2021/0311661 | A1 | 10/2021 | Kotzur et al. | |
| 2023/0035079 | A1 | 2/2023 | Han et al. | |

OTHER PUBLICATIONS

Cai et al. "Efficient caching on parity chunks in RAID-enabled SSDs", IEICE Electronics Express 18(7):1-6 (2021).

Kim et al. "Building Reliable Massive Capacity SSDs through a Flash Aware RAID-Like Protection", Appl. Sci. 10 (24):9149 (Dec. 2020).

* cited by examiner

STORAGE DEVICES INCLUDING NONVOLATILE MEMORY AND RELATED METHODS

CROSS TO REFERENCE TO RELATED APPLICATIONS

This application is a continuation of and claims priority to U.S. patent application Ser. No. 18/314,978 filed on May 10, 2023, which claims the benefit of priority under 35 U.S.C. § 119 to Korean Patent Application No. 10-2022-0109014 filed on Aug. 30, 2022, the disclosures of which are hereby incorporated by reference herein in their entirety.

BACKGROUND

Example embodiments of the present disclosure relate to a memory storage device including a nonvolatile memory.

Nonvolatile memory devices have been widely used as data storage media for audio and video in information technology IT devices such as computers, smartphones, personal digital assistants PDAs, digital cameras, camcorders, voice recorders, MP3 players, and portable computers (such as Handheld personal computers PCs). An example of a nonvolatile memory-based mass storage device may include a solid state drive (SSD).

In accordance with the trend of increasing capacity of storage devices, a storage device may include a plurality of nonvolatile memory devices. The storage device may generate a parity block by performing a parity operation on data blocks and may store the data blocks and the parity block throughout the plurality of nonvolatile memory devices to improve performance and to reliability of data storage.

SUMMARY

Some example embodiments of the present disclosure may provide storage devices which may have improved performance by reducing resource consumption used/required to update parity blocks associated with a portion of data blocks when a portion of the data blocks stored throughout a plurality of nonvolatile memories are updated.

Some example embodiments of the present disclosure may provide storage devices which may reduce resource consumption when moving data between nonvolatile memories by enabling nonvolatile memories to transmit and receive data without using a storage controller.

According to some example embodiments of the present disclosure, a storage device includes a plurality of nonvolatile memory devices, a storage controller, and a data bus. The plurality of nonvolatile memory devices include at least first and second nonvolatile memory devices. The storage controller is configured to receive a plurality of data blocks from a host, to generate a first parity block by performing an XOR operation on the plurality of data blocks and to distribute the plurality of data blocks and the first parity block to respective ones of the plurality of nonvolatile memory devices, wherein a first data block of the plurality of data blocks is distributed to the first nonvolatile memory device and the first parity block is distributed to the second nonvolatile memory device. The data bus is configured to transfer signals between the plurality of nonvolatile memory devices and the storage controller. The storage controller is configured to receive a new data block from the host and to provide the new data block to the second nonvolatile memory device, wherein the new data block is associated with the first data block. The first nonvolatile memory device is configured to provide the first data block to the second nonvolatile memory device through the data bus without using the storage controller. The second nonvolatile memory device is configured to generate a new parity block by performing an XOR operation on the new data block, the first data block, and the first parity block, and to store the new parity block.

According to some example embodiments of the present disclosure, a storage device includes a plurality of nonvolatile memory devices, a storage controller, and a data bus. The plurality of nonvolatile memory devices includes at least first and second nonvolatile memory devices. The storage controller is configured to receive a plurality of data blocks from a host, to generate a first parity block by performing an XOR operation on the plurality of data blocks, and to distribute the plurality of data blocks and the first parity block to respective ones of the plurality of nonvolatile memory devices, wherein a first data block of the plurality of data blocks is distributed to the first nonvolatile memory device and the first parity block is distributed to the second nonvolatile memory device. The data bus is configured to transfer signals between the plurality of nonvolatile memory devices and the storage controller. The storage controller is configured to receive a new data block from the host, and to provide the new data block to the first nonvolatile memory device, wherein the new data block is associated with the first data block. The first nonvolatile memory device is configured to generate difference data by performing an XOR operation on the new data block and the first data block, and to provide the difference data to the second nonvolatile memory device without using the storage controller. The second nonvolatile memory device is configured to generate a new parity block by performing an XOR operation on the difference data and the first parity block, and to store the new parity block.

According to some example embodiments of the present disclosure, a storage device includes a plurality of nonvolatile memory devices, a storage controller, and a data bus. The storage controller is configured to control the plurality of nonvolatile memory devices. The data bus is configured to transfer signals between the plurality of nonvolatile memory devices and the storage controller. The storage controller is configured to enable a data output operation of a source nonvolatile memory device among the plurality of nonvolatile memory devices, to enable a data input operation of a destination nonvolatile memory device among the plurality of nonvolatile memory devices, and to transmit a read enable signal to the data bus. The source nonvolatile memory device is configured to transmit data stored therein to the data bus in response to the read enable signal. The destination nonvolatile memory device is configured to ignore the read enable signal and to obtain the data transmitted by the source nonvolatile memory device to the data bus.

According to some example embodiments of the present disclosure, a storage device includes a plurality of nonvolatile memory devices, a storage controller, and a plurality of data buses. The plurality of nonvolatile memory devices includes at least first and second nonvolatile memory devices. The storage controller is configured to stripe a plurality of data blocks and a first parity block associated with the plurality of data blocks to the plurality of nonvolatile memory devices. The plurality of data buses are configured to transfer signals between the plurality of nonvolatile memory devices and the storage controller. The storage controller is configured to receive a new data block from a host wherein the new data block corresponds to an first data block of the plurality of data blocks, and to control difference data stored in the first nonvolatile memory device wherein the difference data represents bits having different values in the first data block and the new data block to be obtained by the second nonvolatile memory device in which the first parity block associated with the plurality of data blocks including the first data block is stored. The second nonvolatile memory device is configured to generate a new parity block using the difference data and the first parity block, and to store the new parity block.

According to some example embodiments of the present disclosure, a method is provided to operate a storage device including a storage controller and a plurality of nonvolatile memory devices. A plurality of original data blocks are received at the storage controller from a host. An original parity block is generated based on the plurality of original data blocks at the storage controller. The plurality of original data blocks and the original parity block are stored in respective ones of the plurality of nonvolatile memory devices, wherein a first original data block of the plurality of original data blocks is stored in a first nonvolatile memory device of the plurality of nonvolatile memory devices, and wherein the original parity block is stored in a second nonvolatile memory device of the plurality of nonvolatile memory devices. A new data block corresponding to the first original data block is received at the storage controller from the host after storing the plurality of original data blocks and the original parity block. The new data block is stored in the first nonvolatile memory device. A new parity block is generated at the second nonvolatile memory device based on the original parity block and based on differences between the first original data block and the new data block.

BRIEF DESCRIPTION OF DRAWINGS

The above and other aspects, features, and advantages of some embodiments of the present disclosure will be more clearly understood from the following detailed description, taken in conjunction with the accompanying drawings, in which.

DETAILED DESCRIPTION

Hereinafter, some embodiments of the present disclosure will be described as follows with reference to the accompanying drawings.

It will be understood that, although the terms first, second, etc. may be used herein to describe various elements, these elements should not be limited by these terms. These terms are only used to distinguish one element from another element. Thus, a first element discussed below could be termed a second element without departing from the scope of the present inventive concepts.

Figure 1:
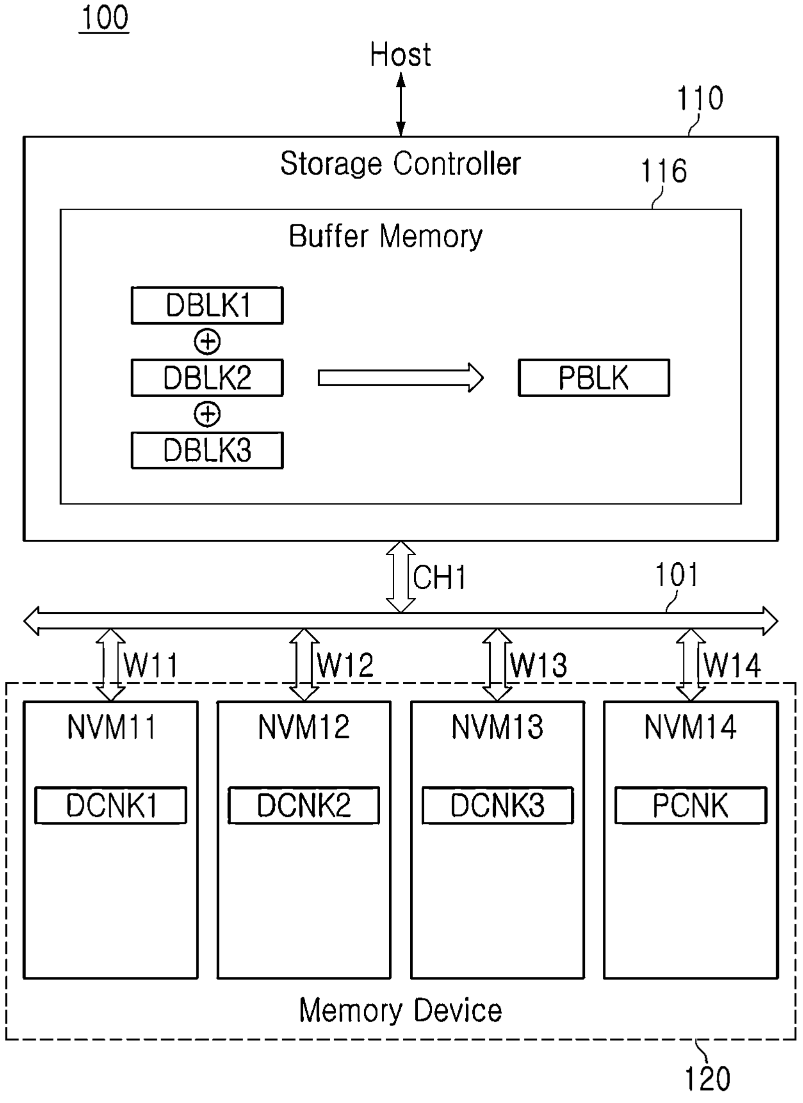
FIG. 1 is a block diagram illustrating a storage device according to example embodiments of the present disclosure.

FIG. 1 is a block diagram illustrating a storage device according to some example embodiments of the present disclosure.

The storage device 100 may include storage media used to store data in response to a request from a host. As an example, the storage device 100 may include at least one of a solid state drive (SSD), an embedded memory, and a removable external memory. When the storage device 100 is implemented as an SSD, the storage device 100 may conform to the nonvolatile memory express (NVMe) standard. When the storage device 100 is implemented as an embedded memory or an external memory, the storage device 100 may conform to a universal flash storage (UFS) standard or an embedded multi-media card (eMMC) standard. The host and the storage device 100 may generate a packet according to an adopted standard protocol and may transmit the packet.

The host may include electronic devices, such as, for example, portable electronic devices such as mobile phones, MP3 players, and laptop computers, and/or electronic devices such as desktop computers, game consoles, televisions TVs, and/or projectors. The host may include at least one operating system (OS). The operating system may manage and control overall functions and operations of the host.

Referring to FIG. 1, the storage device 100 may include a storage controller 110, a memory device 120 and a data bus 101. The memory device 120 may store data provided from the host and may provide/output data in response to a request from the host. The storage controller 110 may control the memory device 120 in response to a request from a host. The data bus 101 may transfer signals between the storage controller 110 and the memory device 120.

The storage controller 110 may include a buffer memory 116. The buffer memory 116 may buffer data to be stored in the memory device 120 and data provided/output by the memory device 120.

The memory device 120 may maintain stored data even when power is not supplied. The memory device 120 may store data provided from the host 100 through a program operation, and may provide/output data stored in the memory device 120 through a read operation. The memory device 120 may include a plurality of nonvolatile memories NVM11-NVM14. The nonvolatile memories NVM11-NVM14 may each include a plurality of memory blocks. A memory block may include a plurality of pages each including a plurality of memory cells. The memory cells may be programmed or read by units of pages, and may be erased by units of memory blocks.

The plurality of nonvolatile memories NVM11-NVM14 may transmit signals to and receive signals from the storage controller 110 through a channel CH1 and a plurality of ways W11-W14 connected to the data bus 101. The plurality of nonvolatile memories NVM11-NVM14 may share one data bus 101.

The plurality of nonvolatile memories NVM11-NVM14 may operate independently of each other. For example, the storage controller 110 may provide commands to each of the plurality of nonvolatile memories NVM11-NVM14 in sequence through one channel CH1. However, the nonvolatile memories NVM11-NVM14 receiving commands in sequence may operate in parallel with each other.

The storage controller 110 may stripe data blocks and parity blocks generated based on the data blocks using a parallel operation of the nonvolatile memories NVM11-NVM14 to improve performance and reliability of the storage device 100. The striping the data blocks and the parity block may include distributing the data blocks and the parity block to a plurality of nonvolatile memories NVM11-NVM14, and controlling the data blocks and the parity block to be stored throughout the plurality of nonvolatile memories NVM11-NVM14.

Referring to FIG. 1, the buffer memory 116 may buffer the data blocks DBLK1-DBLK3 of a predetermined size. For example, the data blocks DBLK1-DBLK3 may include data received from the host.

The storage controller 110 may generate a parity block PBLK by performing a parity operation on the buffered data blocks DBLK1-DBLK3. Specifically, the storage controller 110 may generate a parity block PBLK by performing an XOR operation on bits of the same digit for each of the data bits included in the data blocks DBLK1-DBLK3.

The storage controller 110 may store the data blocks DBLK1-DBLK3 and the parity block PBLK throughout the plurality of nonvolatile memories NVM11-NVM14. For example, the first data block DBLK1 may be stored in the first nonvolatile memory NVM11, the second data block DBLK2 may be stored in the second nonvolatile memory NVM12, the third data block DBLK3 may be stored in the third nonvolatile memory NVM13, and the parity block PBLK may be stored in the fourth nonvolatile memory NVM14.

Meanwhile, internal parity including parity bits may be added to each of the data blocks DBLK1-DBLK3 and the parity block PBLK stored in the nonvolatile memories NVM11-NVM14. The internal parity may be generated by performing an error correction coding (ECC) encoding operation, for example, a low density parity coding (LDPC) operation on each of the data blocks DBLK1-DBLK3 and the parity block PBLK.

In FIG. 1, the data blocks DBLK1-DBLK3 to which internal parity is added may be indicated as data chunks DCNK1-DCNK3, and the parity block PBLK to which internal parity is added may be indicated as a parity chunk PCNK. The data chunks DCNK1-DCNK3 and the parity chunks PCNK may collectively be referred to as a stripe. When one of the data chunks DCNK1-DCNK3 may not be corrected through an ECC decoding operation, the data chunk may be recovered by performing a parity operation on the parity chunk and the other data chunks included in the stripe. Accordingly, when the storage device 100 stripes data to the nonvolatile memories NVM11-NVM14, reliability of the data may be improved/guaranteed.

When one of existing data chunks included in a stripe is updated, an existing parity chunk included in the same stripe as the existing data chunk may also need to be updated. Accordingly, performance of the storage device 100 may be reduced.

Specifically, the storage device 100 may generate a new parity block by performing a parity operation using a new data block, an existing data block, and an existing parity block, and may update a parity chunk by adding internal parity to the new parity block. When the storage controller 110 needs to update the parity chunk, the existing data block and the existing parity block stored in the memory device 120 may need to be loaded into the buffer memory 116, and the new data block and the updated parity block may need to be programmed into the memory device 120. Accordingly, the amount of data input/output between the storage controller 110 and the memory device 120 may increase, and the amount of use of the buffer memory 116 may increase, which may lead to reduction of performance of the storage device 100.

In some example embodiments, the storage device 100 may offload a parity operation to the memory device 120. For example, the parity chunk may be updated by performing a parity operation in the fourth nonvolatile memory NVM14 storing the existing parity chunk among the nonvolatile memories NVM11-NVM14. The fourth nonvolatile memory NVM14 may require an existing data block to update the parity chunk.

In some example embodiments, each of the nonvolatile memories NVM11-NVM14 may transmit and receive data through the data bus 101 without using the storage controller 110. For example, the fourth nonvolatile memory NVM14 may obtain an existing data block from the first nonvolatile memory NVM11 without using the storage controller 110.

Also, the nonvolatile memories NVM11-NVM14 may perform ECC encoding and ECC decoding operations. Accordingly, the first nonvolatile memory NVM11 may generate an error-corrected data block by performing an ECC decoding operation on the existing data chunk. The fourth nonvolatile memory NVM14 may obtain a data block having an error corrected.

In some example embodiments, the amount of data input/output between the storage controller 110 and the memory device 120 may be reduced, and the amount of use of the buffer memory 116 may be reduced. Accordingly, performance of the storage device 100 may improve.

A storage device according to some example embodiments will be described in detail with reference to FIGS. 2 to 4.

Figure 2:
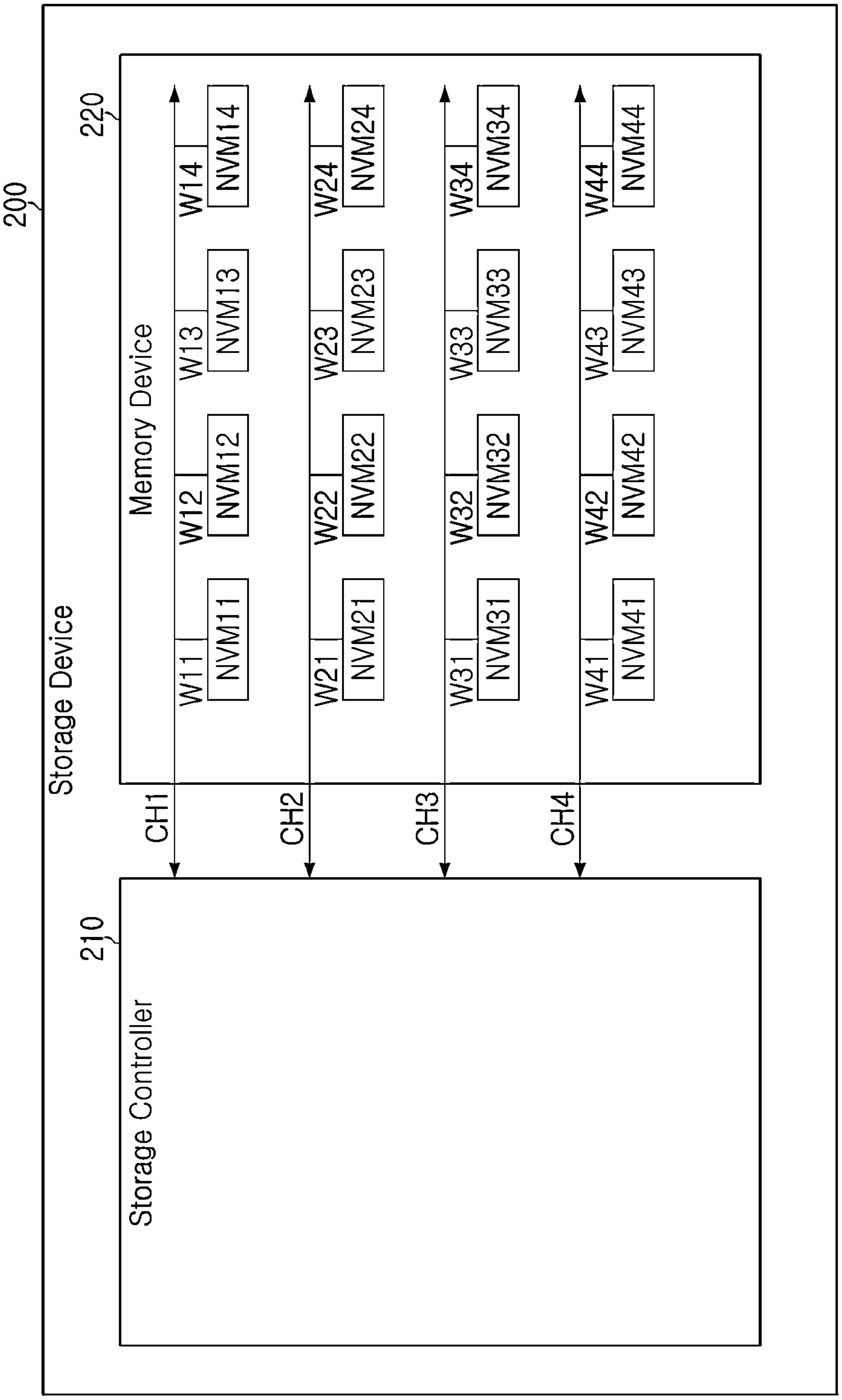
FIGS. 2 to 4 are block diagrams illustrating a storage device according to example embodiments of the present disclosure.

FIG. 2 is a block diagram illustrating a storage device according to some example embodiments.

Referring to FIG. 2, the storage device 200 may include a storage controller 210 and a memory device 220. The storage controller 210 and memory device 220 in FIG. 2 may correspond to the storage controller 110 and memory device 120 described with reference to FIG. 1. The memory device 220 and the storage controller 210 may be connected to each other through a plurality of channels CH1-CH4. For example, the storage device may be implemented as a solid state drive (SSD).

The memory device 220 may include a plurality of nonvolatile memories NVM11-NVM44. Each of the nonvolatile memories NVM11-NVM44 may be connected to one of the plurality of channels CH1-CH4 through a corresponding way. For example, the nonvolatile memories NVM11-NVM14 may be connected to the first channel CH1 through ways W11-W14, and the nonvolatile memories NVM21-NVM24 may be connected to the second channel CH2 through ways W21-W24.

In some example embodiments, each of the nonvolatile memories NVM11-NVM44 may be implemented as an arbitrary memory unit/device to operate according to individual commands from the controller 210. For example, each of the nonvolatile memories NVM11-NVM44 may be implemented as a chip or a die.

The storage controller 210 may transmit signals to and receive signals from the memory device 220 through a plurality of channels CH1-CH4. For example, the storage controller 210 may transmit commands, addresses, and data to the memory device 220 and/or may receive data from the memory device 220 through the channels CH1-CH4.

The storage controller 210 may select one of the nonvolatile memories connected to the corresponding channel through each channel and may transmit/receive signals with the selected nonvolatile memory. The storage controller 210 may transmit commands, addresses, and data to the selected nonvolatile memory through a channel or may receive data from the selected nonvolatile memory.

The storage controller 210 may transmit signals to and receive signals from the memory device 220 in parallel through different channels. For example, the storage controller 210 may transmit another command to the memory device 220 through the second channel CH2 while transmitting a command to the memory device 220 through the first channel CH1. Also, the storage controller 210 may receive other data from the memory device 220 through the second channel CH2 while receiving data from the memory device 220 through the first channel CH1.

Each of the nonvolatile memories connected to the storage controller 210 through the same channel may perform internal operations in parallel. For example, the storage controller 210 may transmit commands and addresses in sequence to the nonvolatile memories NVM11-NVM14 through the first channel CH1. When a command and an address are transmitted to the nonvolatile memories NVM11-NVM14, each of the nonvolatile memories NVM11-NVM14 may perform an operation according to the command in parallel.

In FIG. 2, the memory device 220 may communicate with the storage controller 210 through four channels and may include four nonvolatile memories connected to each channel of the memory device 220. However, some example embodiments thereof are not limited thereto, and the number of channels and the number of nonvolatile memories connected to one channel may be varied.

Figure 3:
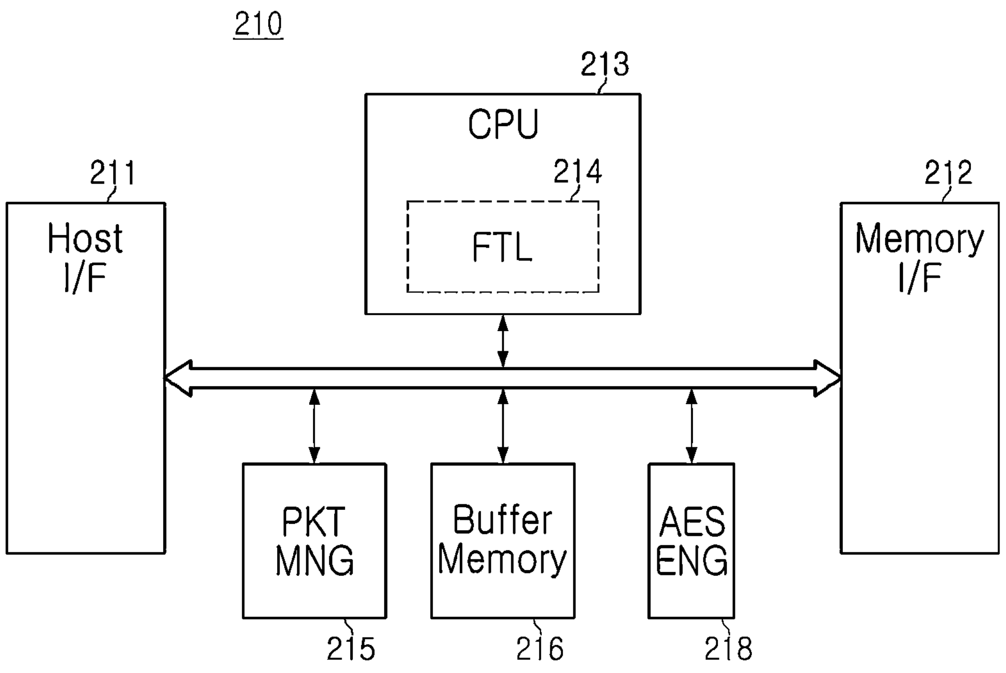

FIG. 3 is a diagram illustrating a storage controller included in the storage device in FIG. 2 in greater detail.

The storage controller 210 may include a host interface 211, a memory interface 212, and a central processing unit (CPU) 213. Also, the storage controller 210 may further include a packet manager 215, a buffer memory 216, and an advanced encryption standard (AES) engine 218. The CPU 213 may drive a flash translation layer (FTL) 214, and the controller 210 may further include a working memory (not illustrated) into which the FTL 214 is loaded.

The host interface 211 may transmit packets to and receive packets from the host. A packet transmitted from the host to the host interface 211 may include a command or data to be written to the memory device 220, and a packet transmitted from the host interface 211 to the host may include a response to the command or data read from the memory device 220.

The memory interface 212 may transmit data to be written to the memory device 220 or may receive data read from the memory device 220. The memory interface 212 may be implemented to comply with standards such as Toggle or open NAND flash interface (ONFI).

The FTL 214 may perform various functions to manage the memory device 220, including an address mapping operation. The address mapping operation may be an operation of changing a logical address received from the host into a physical address used to actually store data in the memory device 220. The FTL 214 may generate map data indicating a mapping relationship between a logical address and a physical address in order to convert a logical address into a physical address.

The packet manager 215 may generate a packet according to the protocol of the interface negotiated with the host or may parse various information from the packet received from the host.

The buffer memory 216 may temporarily store data to be written to the memory device 220 or data to be read from the memory device 220. The buffer memory 216 may be included in the storage controller 210, or may be disposed externally of the storage controller 210.

The AES engine 218 may perform at least one of an encryption operation and a decryption operation on data input to the storage controller 210 using a symmetric-key algorithm.

Figure 4:
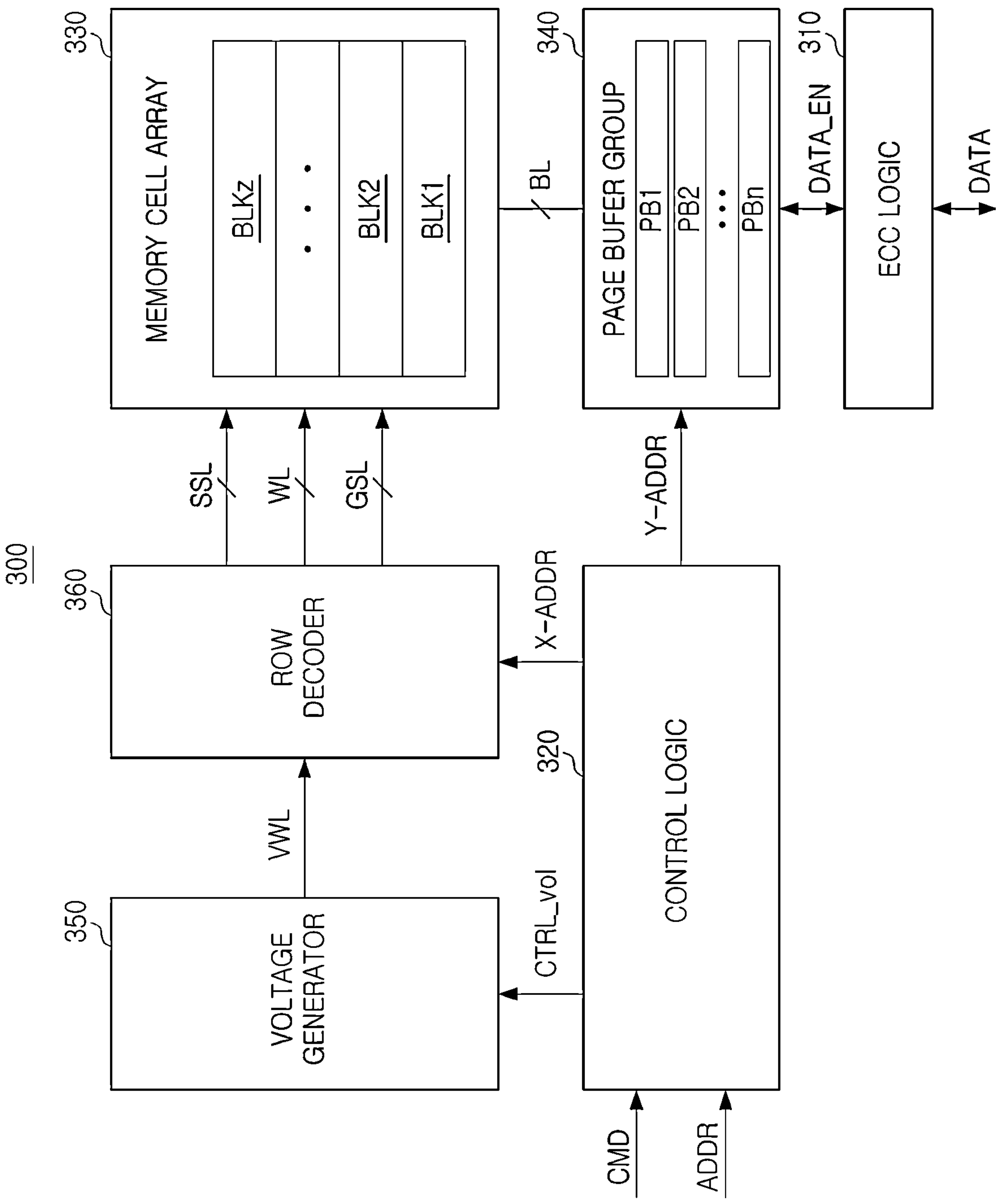

FIG. 4 is a diagram illustrating a nonvolatile memory included in the storage device in FIG. 2 in greater detail.

FIG. 4 is a block diagram illustrating an example of a nonvolatile memory. Referring to FIG. 4, a nonvolatile memory 300 may include an ECC logic circuit 310, a control logic circuit 320, a memory cell array 330, a page buffer group 340, a voltage generator 350, and a row decoder 360. Although not illustrated in FIG. 4, the nonvolatile memory 300 may further include a memory interface circuit configured to receive a command CMD and an address ADDR from an external entity and to exchange data DATA with an external entity, and may further include a column logic, a pre-decoder, a temperature sensor, a command decoder, and/or an address decoder. The nonvolatile memory 300 in FIG. 4 may correspond to one of the nonvolatile memories NVM11-NVM44 illustrated in FIG. 2.

The ECC logic circuit 310 may perform an error detection and correction function to read data read from the memory device 220. More specifically, the ECC logic circuit 310 may generate parity bits for write data to be written in the memory device 220, and the parity bits generated as above may be stored in the memory device 220 together with the write data. When data is read from the memory device 220, the ECC logic circuit 310 may correct an error in the read data using parity bits read from the memory device 220 together with the read data, and may provide/output the error-corrected read data.

The control logic circuit 320 may control various operations in the nonvolatile memory 300. The control logic circuit 320 may provide/output various control signals in response to a command CMD and/or an address ADDR from the memory interface circuit. For example, the control logic circuit 320 may provide/output a voltage control signal CTRL_vol, a row address X-ADDR, and a column address Y-ADDR.

The memory cell array 330 may include a plurality of memory blocks BLK1 to BLKz (where z is a positive integer), and each of the plurality of memory blocks BLK1 to BLKz may include a plurality of memory cells. The memory cell array 330 may be connected to the page buffer unit 340 through bit lines BL, and may be connected to the row decoder 360 through word lines WL, string select lines SSL, and ground select lines GSL.

The memory cell array 330 may include a plurality of memory cells. For example, the plurality of memory cells may be configured as flash memory cells. However, some example embodiments thereof are not limited thereto, and memory cells may be implemented as resistive random access memory (RRAM) cells, ferroelectric random access memory (FRAM) cells, phase change random access memory (PRAM) cells, thyristor random access memory (TRAM) cells, and/or magnetic random access memory (MRAM) cells. Hereinafter, some example embodiments in which the memory cells are implemented as NAND flash memory cells will be described.

In some example embodiments, the memory cell array 330 may include a three-dimensional (3D) memory cell array, and the 3D memory cell array may include a plurality of NAND strings. Each NAND string may include memory cells connected to word lines vertically stacked on a substrate, respectively. U.S. Pat. Nos. 7,679,133, 8,553,466, 8,654,587, 8,559,235, and U.S. Patent Publication No. 2011/0233648 are incorporated herein by reference. In some example embodiments, the memory cell array 330 may include a 2D memory cell array, and the 2D memory cell array may include a plurality of NAND strings disposed along row and column directions.

The page buffer group 340 may include a plurality of page buffers PB1-PBn (where n is an integer greater than or equal to 3), and the plurality of page buffers PB1-PBn may be connected to the memory cells, respectively, through the plurality of bit lines BL. The page buffer group 340 may select at least one bit line from among the bit lines BL in response to the column address Y-ADDR. The page buffer group 340 may operate as a write driver or a sense amplifier depending on an operation mode. For example, during a program operation, the page buffer group 340 may apply a bit line voltage corresponding to data to be programmed to a selected bit line. During a read operation, the page buffer group 340 may sense data stored in a memory cell by sensing a current or voltage of a selected bit line. Each of the plurality of page buffers PB1-PBn may include a plurality of latches configured to buffer data bits to be programmed or sensed data bits.

The voltage generator 350 may generate various types of voltages used to perform program, read, and/or erase operations based on the voltage control signal CTRL_vol. For example, the voltage generator 350 may generate a program voltage, a read voltage, a program verify voltage, and an erase voltage as the word line voltage VWL.

The row decoder 360 may select one of a plurality of word lines WL and may select one of a plurality of string select lines SSL in response to the row address X-ADDR. For example, during a program operation, the row decoder 360 may apply a program voltage and a program verify voltage to the selected word line, and during a read operation, the row decoder 360 may apply a read voltage to the selected word line.

Figure 5A:
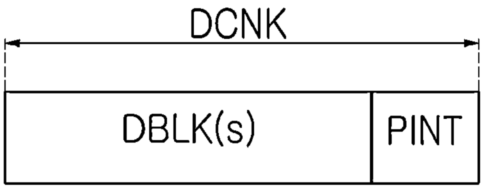
FIGS. 5A to 5C are diagrams illustrating a striping operation of a storage device.
Figure 5B:
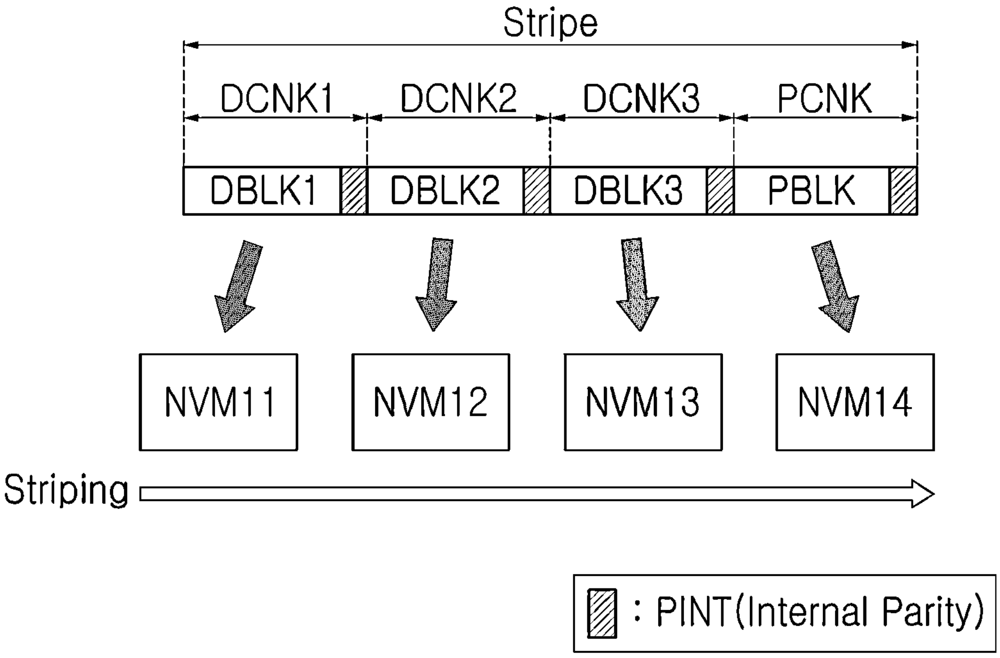
Figure 5C:
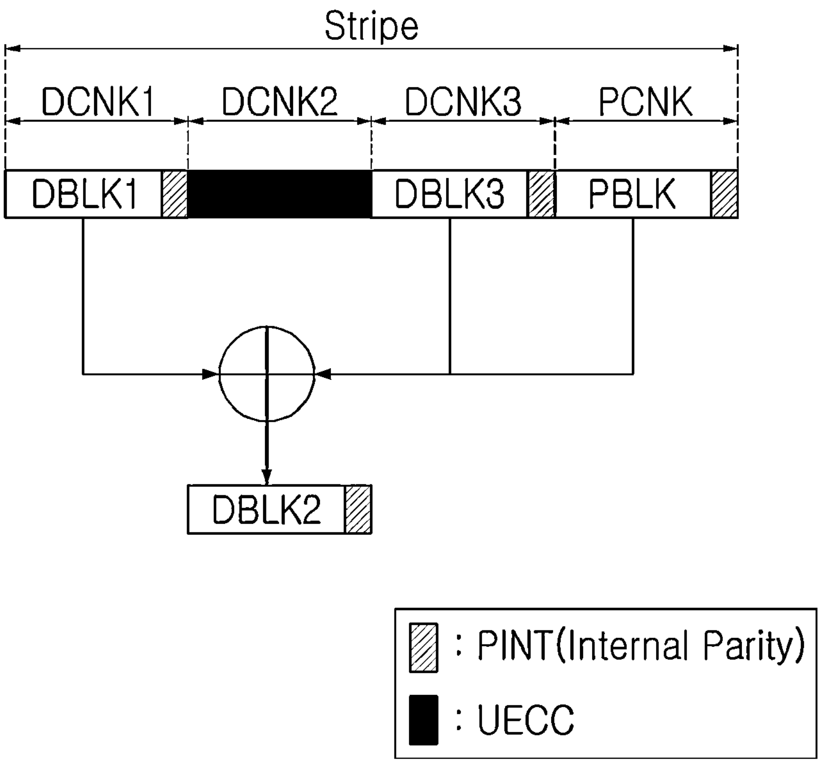

As described with reference to FIG. 1, the storage device 200 may perform an ECC operation and a parity operation and may stripe data to improve/ensure reliability of stored data. FIGS. 5A to 5C are diagrams illustrating a striping operation of a storage device.

FIG. 5A illustrates a data chunk DCNK which may be included in a stripe. The data chunk DCNK may include a data block DBLK and an internal parity block PINT. The data block DBLK may be data which may be accessed by a host and may have a fixed size. For example, the data block DBLK may have a size corresponding to a storage space allocated to one or more logical addresses. The internal parity PINT may include parity bits generated by performing an ECC encoding operation on the data block BLNK.

FIG. 5B illustrates a stripe. A stripe may include a predetermined number of data chunks DCNK1-DCNK3 and a predetermined number of a parity chunk(s) PCNK. In some example embodiments, the data chunks DCNK1-DCNK3 included in a stripe may include logically contiguous data. For example, data continuously received from the host may be divided into data blocks DBLK1-DBLK3 having a predetermined size. Data chunks DCNK1-DCNK3 may be generated by adding an internal parity PINT to each of the data blocks DBLK1-DBLK3.

The parity chunk PCNK may be generated based on a parity operation using a predetermined number of data chunks DCNK1-DCNK3. For example, the parity chunk PCNK may be generated by performing an XOR operation on bits having the same digit number with respect to a plurality of bits of each of the data chunks DCNK1-DCNK3. However, the number of data chunks included in a stripe and the parity operation which may be applied according to some example embodiments are not limited thereto.

The stripe may be stored throughout a plurality of nonvolatile memories NVM11-NVM14. For example, the first data chunk DCNK1 may be stored in the first nonvolatile memory NVM11, the second data chunk DCNK2 may be stored in the second nonvolatile memory NVM12, the third data chunk DCNK3 may be stored in the third nonvolatile memory NVM13, and the parity chunk PCNK may be stored in the fourth nonvolatile memory NVM14.

Even when an uncorrectable error occurs in a data chunk included in the stripe, the data chunk may be restored using the other data chunks and the parity chunk included in the stripe. FIG. 5C illustrates operations of recovering data chunk.

For example, when the second data block DBLK2 is requested from the host, the storage device may, by performing an ECC decoding operation on the second data chunk DCNK2 including the second data block DBLK2, provide the error-corrected second data block DBLK2 to the host. However, when the number of error bits included in the second data chunk DCNK2 exceeds the limit which may be corrected by the ECC decoding operation, the error of the second data chunk DCNK2 may not be corrected even when the ECC decoding operation is performed.

To recover the second data chunk DCNK2, a parity operation may be performed on the other data chunks DCNK1 and DCNK3 and the parity chunk PCNK. For example, when an ECC decoding operation is performed on each of the data chunks DCNK1 and DCNK3 and the parity chunk PCNK, errors in the data chunks DCNK1 and DCNK3 and the parity chunk PCNK may be corrected. Also, when an XOR operation is performed on bits of the same digit of the error-corrected data chunks DCNK1 and DCNK3 and the parity chunk PCNK, the second data chunk DCNK2 may be restored.

Meanwhile, when a data chunk included in one of stripes is updated, the existing parity chunk included in the stripe may no longer be valid, such that the existing parity chunk may also be updated. The parity chunks may be updated by performing an XOR operation on the existing parity chunk, the existing data chunk, and the new data chunk. For example, when an XOR operation is performed on the existing data chunk and the new data chunk, difference data representing which digits of bits have different values in the existing data chunk and the new data chunk may be generated. When an XOR operation is performed on the existing parity chunk and the difference data, bits of digits having different values in the existing data chunk and the new data chunk the parity chunk may be inverted, thereby updating the parity chunk.

In some example embodiments, the storage device may improve performance of the storage device by offloading at least a portion of an operation of updating a parity chunk to the nonvolatile memory.

FIGS. 6A to 6E are diagrams illustrating operations of a storage device updating a parity chunk according to first example embodiments. In FIGS. 6A to 6E, operations of updating a parity chunk will be described using the storage device 100 described with reference to FIG. 1 as an example.

Figure 6A:
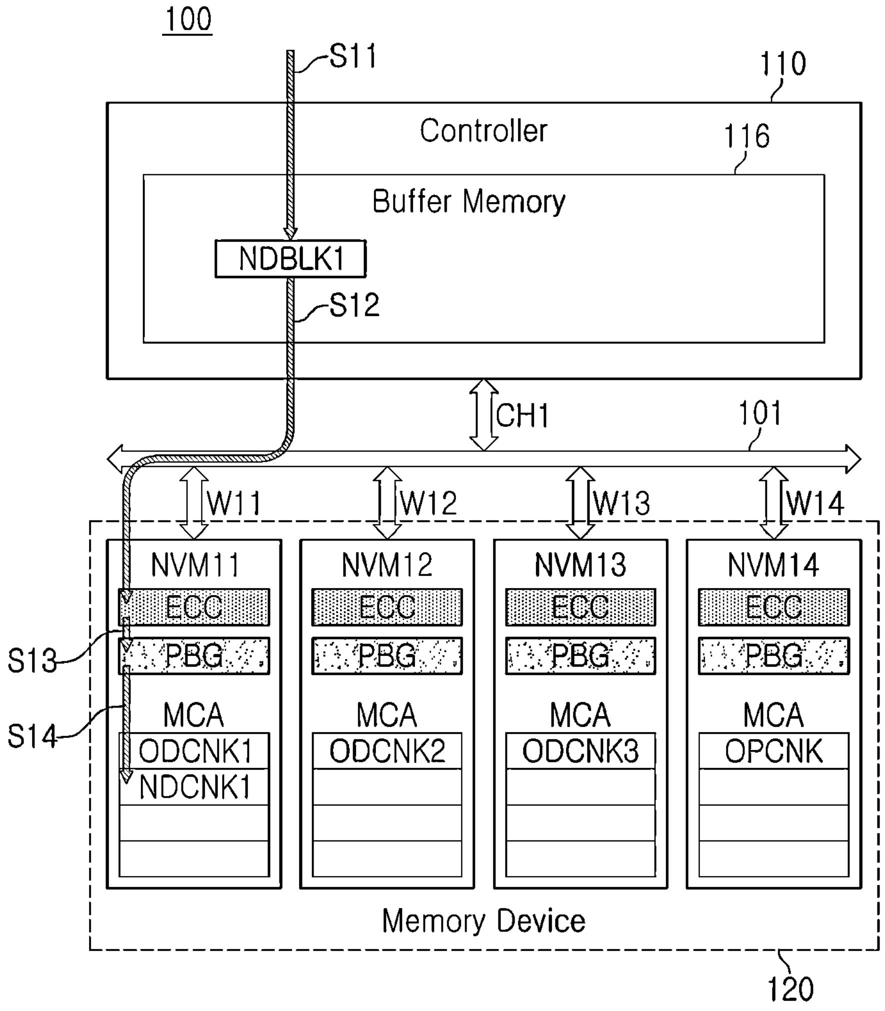
FIGS. 6A to 6E are diagrams illustrating operations of updating a stripe of a storage device according to first example embodiments of the present disclosure.

Referring to FIG. 6A, in operation S11, the storage controller 110 may receive a new data block NDBLK1 from the host and may buffer the new data block NDBLK1 in the buffer memory 116. The new data block NDBLK1 may be obtained by updating an existing data block included in an existing data chunk ODCNK1 stored in the memory device 120. For example, the new data block NDBLK1 may have the same logical address as that of the existing data block.

In operation S12, the storage controller 110 may provide the new data block NDBLK1 to the first nonvolatile memory NVM11 through the first channel CH1 and the first way W11. In operation S13, the first nonvolatile memory NVM11 may generate a new data chunk NDCNK1 by performing an ECC encoding operation on the new data block NDBLK1, and may buffer the new data chunk NDCNK1 in the page buffer group PBG. In operation S14, the first nonvolatile memory NVM12 may program the buffered new data chunk NDCNK1 into the memory cell array MCA.

The existing data chunk ODCNK1 may be included in a stripe together with the other data chunks ODCNK2-ODCNK3 and the existing parity chunk OPCNK. When the existing data chunk ODCNK1 is updated based on the new data block NDBLK1, the existing parity chunk OPCNK may also need to be updated.

Figure 6B:
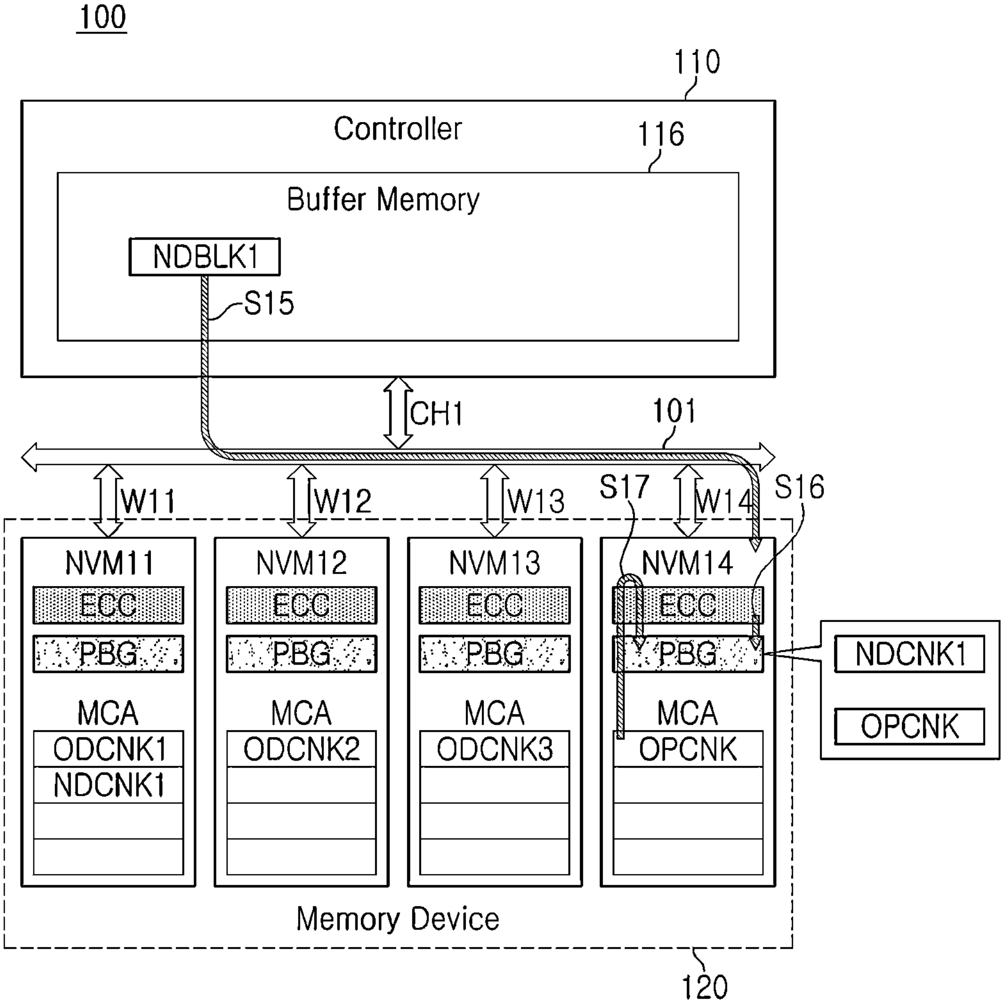

Referring to FIG. 6B, in operation S15, the storage controller 110 may provide the new data block NDBLK1 to the fourth nonvolatile memory NVM14 in which the existing parity chunk OPCNK is stored.

In operation S16, the fourth nonvolatile memory NVM14 may generate a new data chunk NDCNK1 by performing an ECC encoding operation on the new data block NDBLK1 received from the storage controller 110. Also, the fourth nonvolatile memory NVM14 may buffer the new data chunk NDCNK1 in the page buffer group PBG.

In operation S17, the fourth nonvolatile memory NVM14 may buffer the existing parity chunk OPCNK stored in the memory cell array MCA in the page buffer group PBG. The fourth nonvolatile memory NVM14 may detect an error in the existing parity chunk OPCNK read from the memory cell array MCA using an ECC logic circuit and may correct the error, and may buffer the error-corrected existing parity chunk OPCNK in the page buffer group PBG.

The page buffer group PBG may include a plurality of page buffers each corresponding to a bit line of the memory cell array MCA, and each of the plurality of page buffers may include a plurality of latches. Accordingly, the page buffer group PBG may buffer both the new data chunk NDCNK1 and the existing parity chunk OPCNK.

Figure 6C:
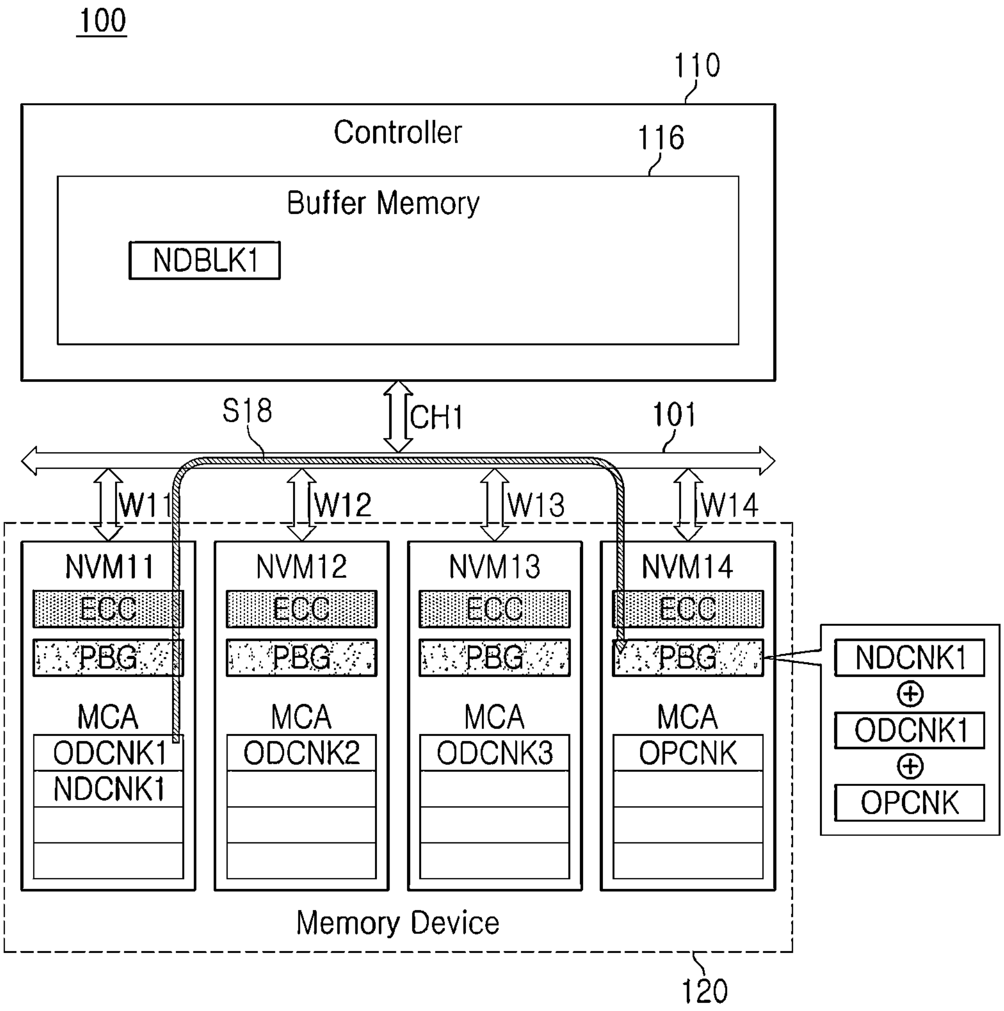

Referring to FIG. 6C, the first nonvolatile memory NVM11 may provide the existing data chunk ODCNK1 to the fourth nonvolatile memory NVM14. In some example embodiments, the first nonvolatile memory NVM11 may not transmit the existing data chunk ODCNK1 to the storage controller 110, and may directly transmit the data to the fourth nonvolatile memory NVM14 through the data bus 101. In other words, the existing data chunk ODCNK1 may be transmitted to the nonvolatile memory NVM14 without passing through the buffer memory 116.

Operations of transmitting data through the data bus 101 without using the storage controller 110 between the nonvolatile memories will be described later with reference to FIGS. 8A to 8D and 9A to 9B.

Referring to FIG. 6C, in the page buffer group PBG of the fourth nonvolatile memory NVM14, the existing data chunk ODCNK1 may be buffered together with the new data chunk NDCNK1 and the existing parity chunk OPCNK. The existing data chunk ODCNK1 transmitted from the first nonvolatile memory NVM11 to the fourth nonvolatile memory NVM14 may pass through ECC logic circuits of the first and fourth nonvolatile memories NVM11 and NVM14. Accordingly, the existing data chunk ODCNK1 buffered in the fourth nonvolatile memory NVM14 may be an error-corrected data chunk.

The fourth nonvolatile memory NVM14 may perform a parity operation on the new data chunk NDCNK1, the existing parity chunk OPCNK, and the existing data chunk ODCNK1 buffered in the page buffer group PBG.

Figure 6D:
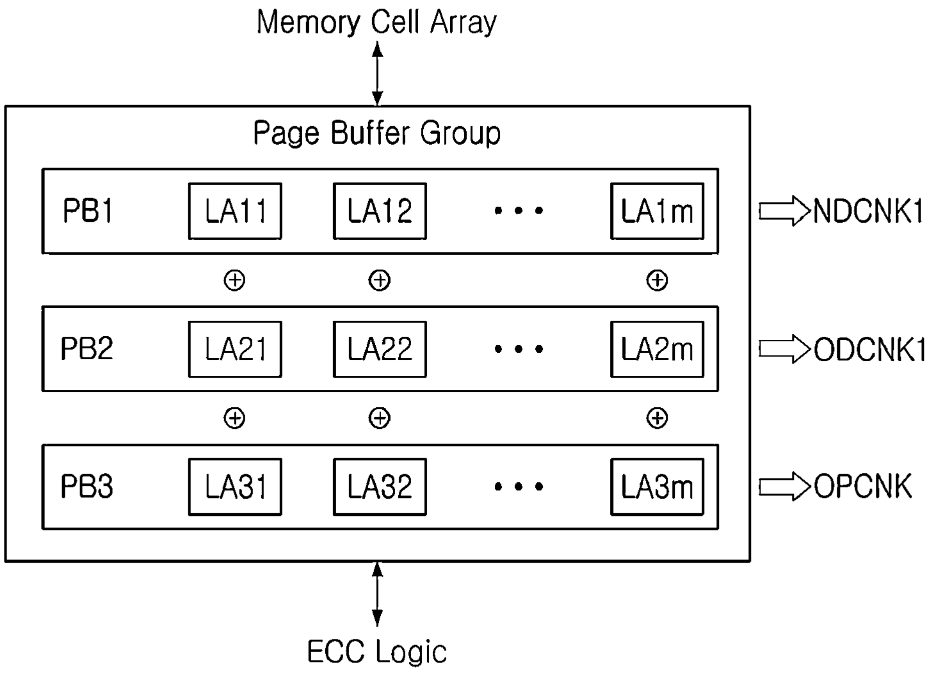

FIG. 6D illustrates an example of a page buffer group of the fourth nonvolatile memory NVM14 in greater detail. As described with reference to FIG. 4, a page buffer group may include a plurality of page buffers PB1-PBn. Each of the page buffers PB1-PBn may include a plurality of latches, and may buffer data read by one bit from a plurality of bit lines.

FIG. 6D illustrates three page buffers PB1-PB3 among a plurality of page buffers PB1-PBn. The new data chunk NDCNK1 may be buffered in the latches LA11-LAIm of the first page buffer PB1, the existing data chunk ODCNK1 may be buffered in the latches LA21-LA2*m* of the second page buffer PB2, and the existing parity chunk OPCNK may be buffered in the latches LA31-LA3*m* of the third page buffer PB3. The fourth nonvolatile memory NVM14 may generate a new parity chunk by performing an XOR operation on data buffered in each of the page buffers PB1-PB3. For example, the fourth nonvolatile memory NVM14 may perform an XOR operation on bits buffered in the first latches LA11, LA12, and LA13, bits buffered in the second latches LA21, LA22, and LA23, and bits buffered in the last latches LA1*m*, LA2*m*, and LA3*m*. For the XOR operation, the page buffer group may further include an operator.

Figure 6E:
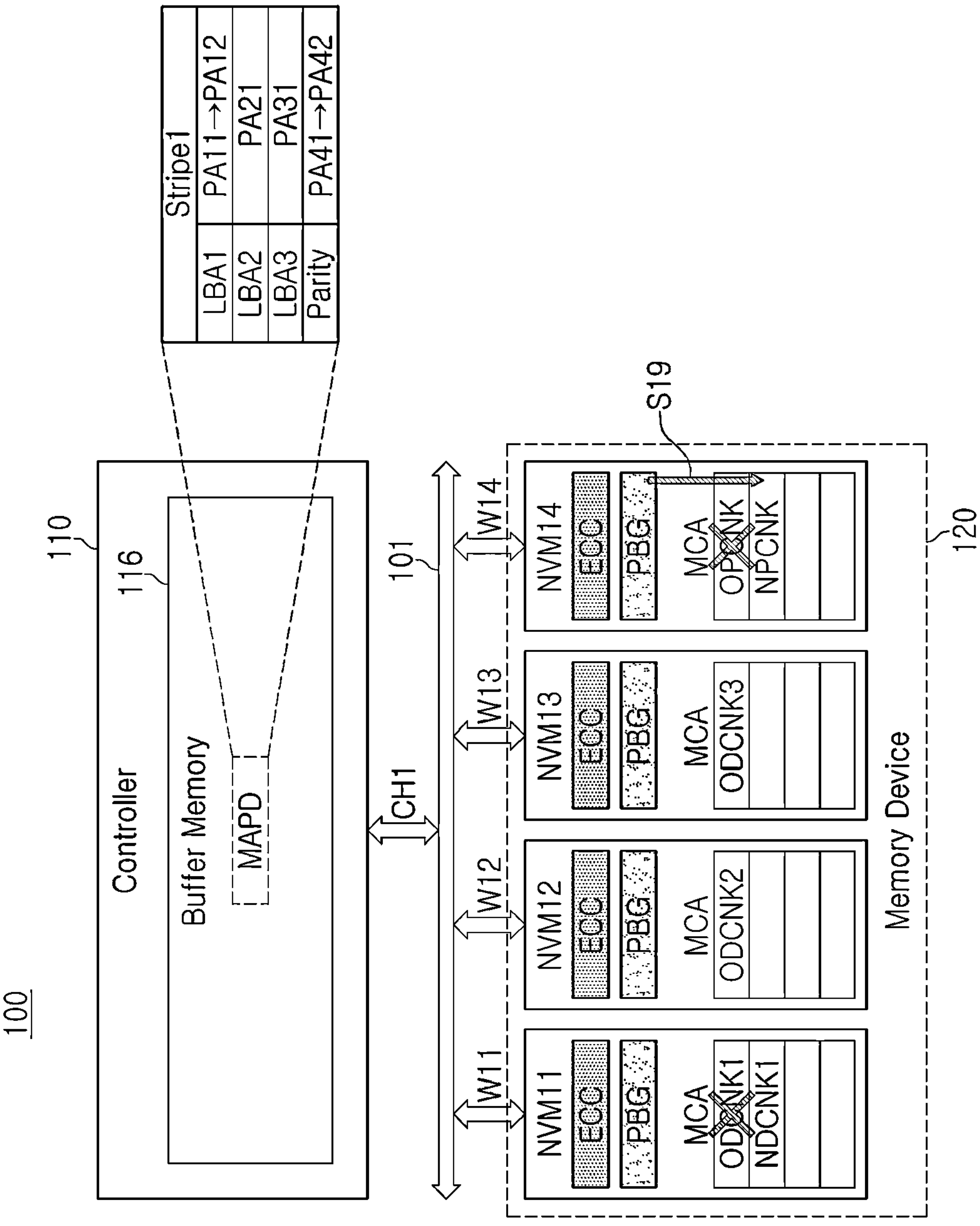

Referring to FIG. 6E, in operation S19, the fourth nonvolatile memory NVM14 may program a new parity chunk NPCNK generated through an XOR operation in a page buffer group into a memory cell array.

The storage controller 110 may complete updating of the stripe by updating the map data MAPD buffered in the buffer memory 116. In some example embodiments, the map data MAPD may include a relationship between logical addresses and physical addresses corresponding to each of the stripes stored in the memory device 120 and physical addresses at which parity chunks are stored. For example, the map data MAPD may include a mapping relationship between the logical addresses LBA1-LBA3 indicating the existing data chunks ODCNK1-ODCNK3 and the physical addresses PA11-PA31 indicating the storage space in which the existing data chunks ODCNK1-ODCNK3 are stored with respect to the first stripe Stripe 1 including the existing data chunks ODCNK1-ODCNK3 and the parity chunk OPCNK, and may further include a physical address PA41 in which the parity chunk PCNK is stored.

The new data chunk NDCNK1 and the new parity chunk NPCNK may be stored in storage spaces different from those of the existing data chunk ODCNK1 and the existing parity chunk OPCNK. The storage controller 110 may update the physical address PA12 mapped to the logical address LBA1 in the map data MAPD and may update the physical address PA42 at which the parity chunk is stored, such that the new data chunk NDCNK1 and the new parity chunk NPCNK may be accessed instead of the existing data chunk ODCNK1 and the existing parity chunk OPCNK.

According to first example embodiments described with reference to FIGS. 6A to 6E, a new parity chunk NPCNK may be generated by performing a parity operation by the fourth nonvolatile memory NVM14 of the memory device 120. Also, the fourth nonvolatile memory NVM14 may obtain the existing data chunk NDCNK1 required to perform the parity operation from the first nonvolatile memory NVM11 without using the storage controller 110. Accordingly, the amount of data input/output between the storage controller 110 and the memory device 120 may be reduced and the amount of use of the buffer memory 116 may be reduced. Accordingly, overhead of the storage device 100 may be reduced and performance may be improved.

Meanwhile, according to first example embodiments, in the fourth nonvolatile memory NVM14 storing the existing parity chunk OPCNK to generate a new parity chunk NPCNK, a parity operation may be performed on the existing data chunk ODCNK1, the new data chunk NDCNK1 and the existing parity chunk OPCNK. However, other example embodiments are not limited to the example in which the fourth nonvolatile memory NVM14 performs the entirety of parity operations used to generate the new parity chunk NPCNK, and the first nonvolatile memory storing the existing data chunk ODCNK1 and the fourth nonvolatile memory NVM14 may perform the parity operation(s) in a divided manner.

Figure 7A:
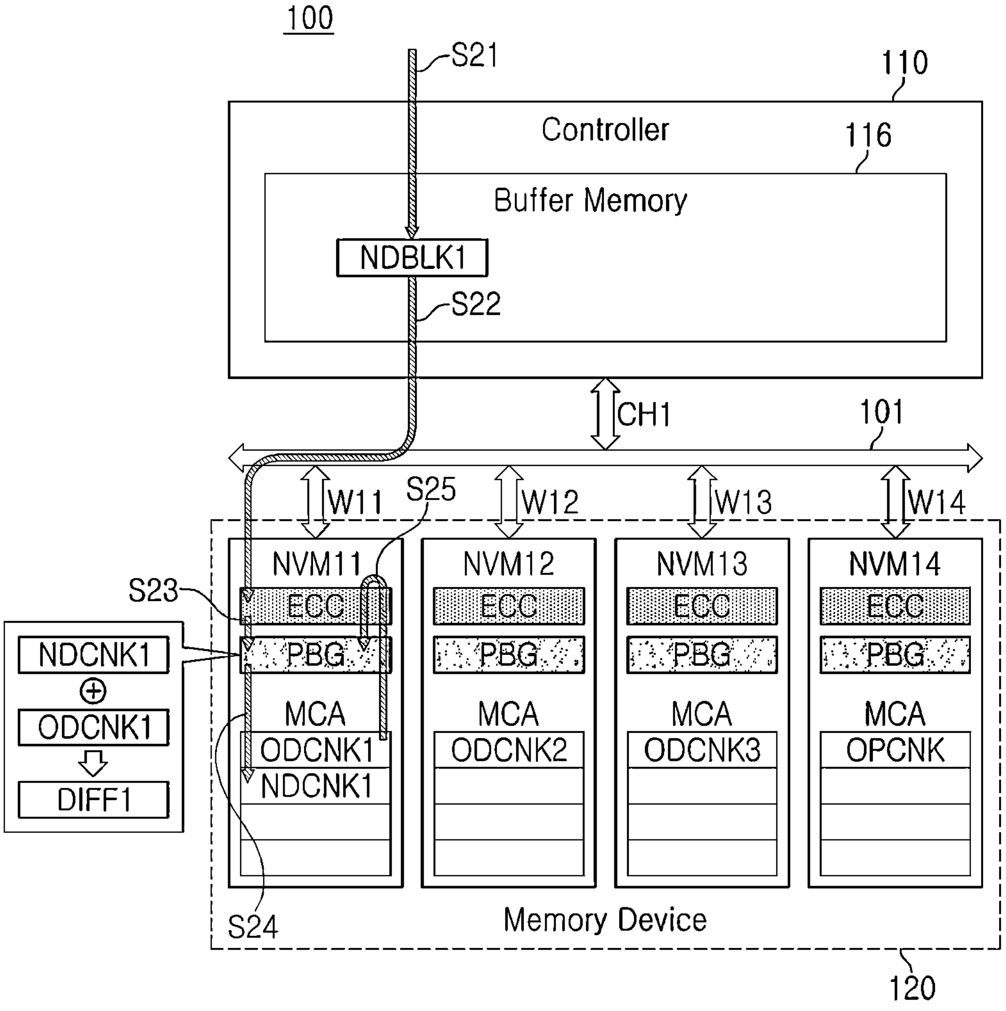
FIGS. 7A to 7B are diagrams illustrating operations of updating a stripe of a storage device according to second example embodiments of the present disclosure.
Figure 7B:
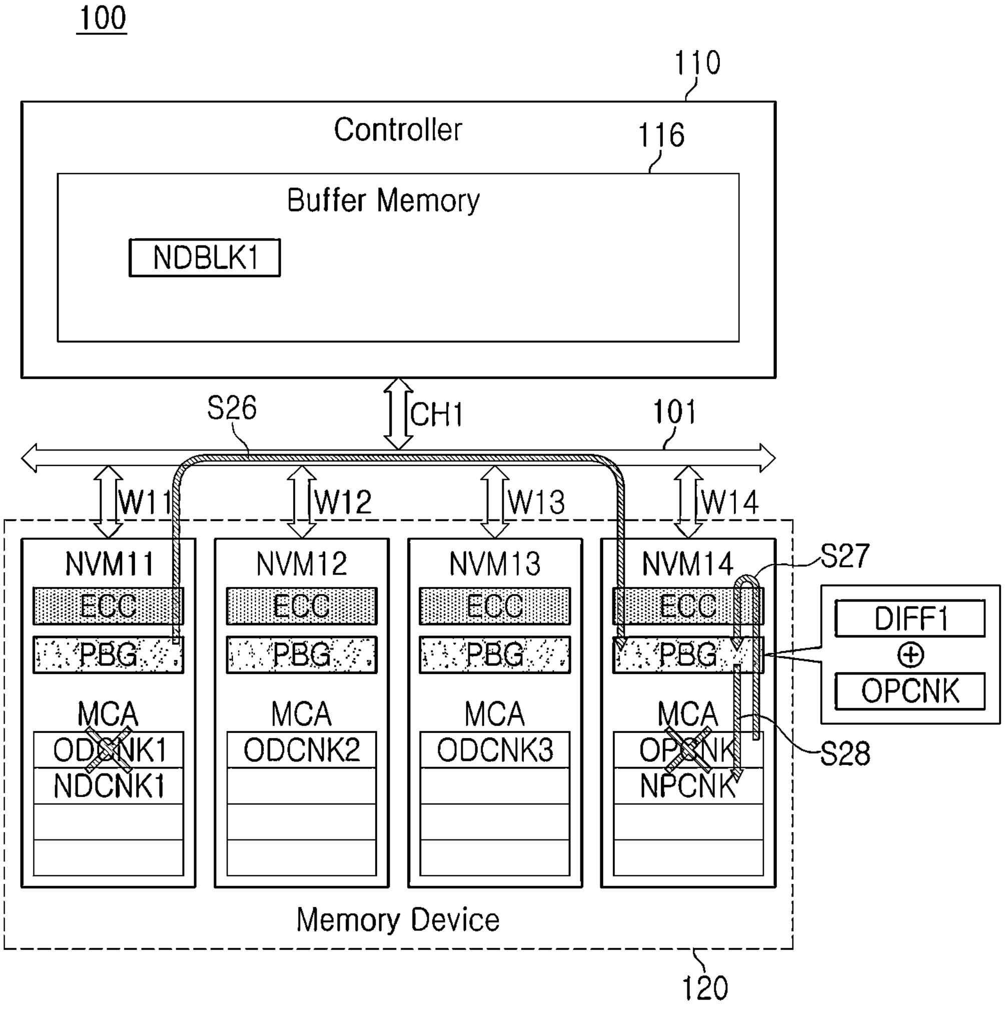

FIGS. 7A and 7B are diagrams illustrating operations of updating a parity chunk by a storage device according to second example embodiments. In FIGS. 7A and 7B, the operations updating a parity chunk will be described using the storage device 100 described with reference to FIG. 1 as an example, and the same/similar descriptions discussed above with respect to first example embodiments may be abridged and/or omitted for the sake of conciseness.

Referring to FIG. 7A, in operation S21, the storage controller 110 may receive a new data block NDBLK1 from the host and may buffer the new data block NDBLK1 in the buffer memory 116. In operation S22, the storage controller 110 may provide the new data block NDBLK1 to the first nonvolatile memory NVM11 in which the existing data chunk NDCNK1 is stored.

In operation S23, the first nonvolatile memory NVM11 may generate a new data chunk NDCNK1 by performing an ECC encoding operation on the new data block NDBLK1 using an ECC logic circuit. The first nonvolatile memory NVM11 may buffer the new data chunk NDCNK1 in the page buffer group PBG.

In operation S24, the first nonvolatile memory NVM11 may program the new data chunk NDCNK1 into the memory cell array MCA. The first nonvolatile memory NVM11 may maintain the new data chunk NDCNK1 buffered in the page buffer group PBG even after the new data chunk NDCNK1 is programmed.

In operation S25, the first nonvolatile memory NVM11 may read the existing data chunk ODCNK1 from the memory cell array MCA and may buffer the existing data chunk ODCNK1 in the page buffer group PBG. The first nonvolatile memory NVM11 may generate difference data DIFF1 indicating which digits of bits have different values in the existing data chunk ODCNK1 and the new data chunk NDCNK1 by performing an XOR operation on bits of the existing data chunk ODCNK1 and the new data chunk NDCNK1.

Referring to FIG. 7B, in operation S26, the fourth nonvolatile memory NVM14 storing the existing parity chunk OPCNK may obtain the difference data DIFF1 from the first nonvolatile memory NVM11 without using the storage controller 110, and may buffer the obtained difference data DIFF1 in the page buffer group PBG.

In operation S27, the fourth nonvolatile memory NVM14 may obtain the existing parity chunk OPCNK from the memory cell array MCA and may buffer the parity chuck in the page buffer group PBG. The fourth nonvolatile memory NVM14 may generate a new parity chunk NPCNK by performing an XOR operation on the difference data DIFF1 buffered in the page buffer group PBG and the existing parity chunk OPCNK.

In operation S28, the fourth nonvolatile memory NVM14 may complete updating of the stripe by programming the new parity chunk NPCNK into the memory cell array MCA.

According to second example embodiments described with reference to FIGS. 7A and 7B, the first nonvolatile memory NVM11 storing the existing data chunk ODCNK1 may perform an XOR operation using the existing data chunk ODCNK1 and the new data chunk ODCNK1, and may provide the difference data DIFF1 to the fourth nonvolatile memory NVM14. The fourth nonvolatile memory NVM14 may generate a new parity chunk NPCNK using the difference data DIFF1 even when the new data chunk NDCNK1 is not obtained from the storage controller 110. Accordingly, the amount of data input/output between the storage controller 110 and the memory device 120 may be further reduced, and performance of the storage device 100 may improve.

Hereinafter, operations of transmitting data between nonvolatile memories through the data bus 101 without using the storage controller 110 will be described in detail with reference to FIGS. 8A to 9B.

FIGS. 8A to 8D are diagrams illustrating data transmission/reception operations of a storage device according to a comparative example different from the example embodiments discussed above. Referring to FIGS. 8A to 8D, the storage device according to the comparative example may include a storage controller, a data bus BUS, and a plurality of nonvolatile memories NVM1-NVM4 similar to the storage device of example embodiments.

Figure 8A:
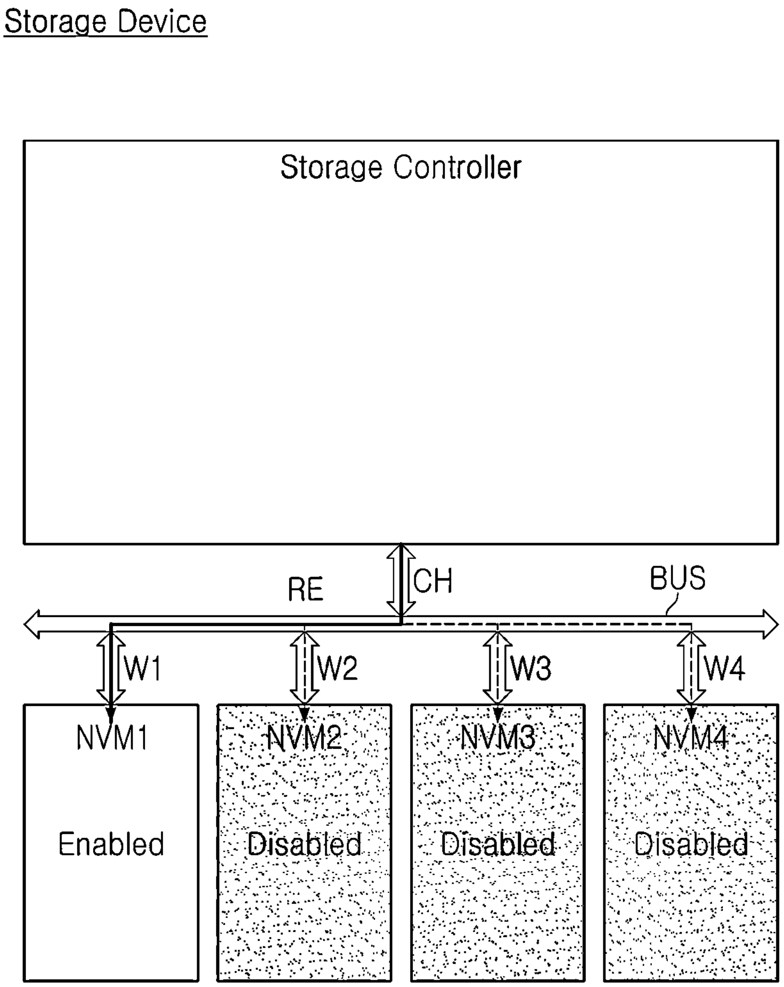
FIGS. 8A to 8D are diagrams illustrating operations of transmitting and receiving data of a storage device according to a comparative example different from example embodiments of the present disclosure.
Figure 8B:
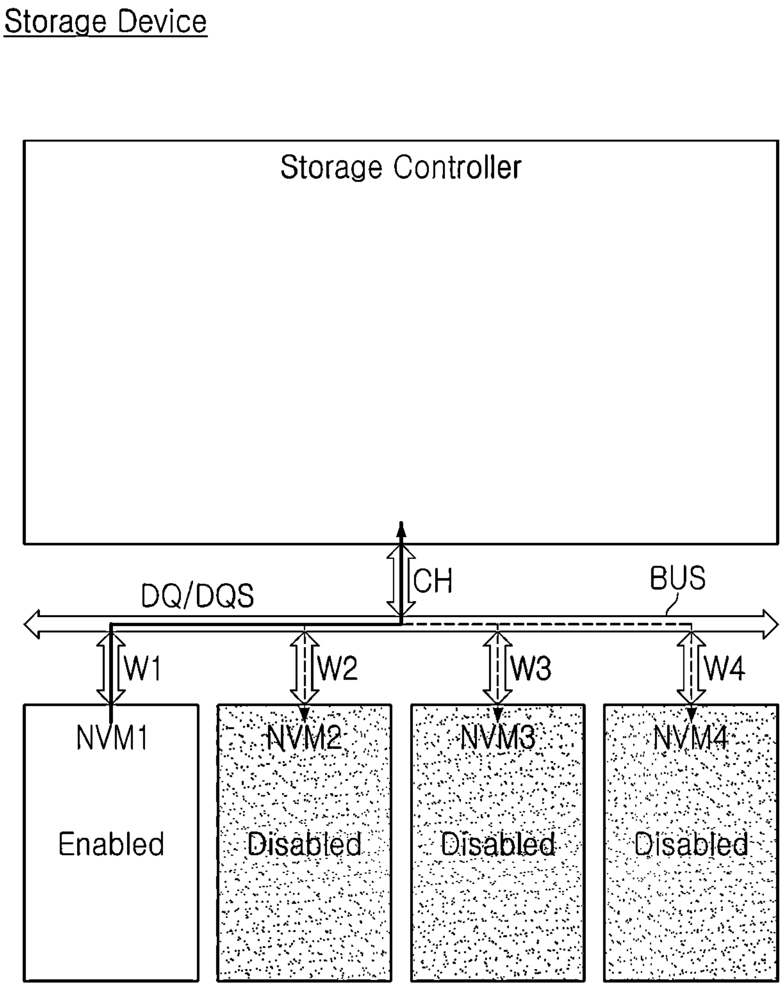

FIGS. 8A and 8B illustrate operations of a storage controller obtaining data from a first nonvolatile memory NVM1.

Referring to FIG. 8A, the storage controller may provide/output a read enable signal RE to a channel CH to which the first nonvolatile memory NVM1 is connected in order to request data from the first nonvolatile memory NVM1. The nonvolatile memories NVM1 to NVM4 may share the data bus BUS. The read enable signal RE provided/output through the channel CH may be transmitted to the nonvolatile memories NVM1 to NVM4 through the data bus BUS.

The storage controller may enable only the first nonvolatile memory NVM1 among the nonvolatile memories NVM1 to NVM4 such that only the first nonvolatile memory NVM1 may provide/output data in response to the read enable signal RE. Specifically, the storage controller may enable the first nonvolatile memory NVM1 by providing/outputting a chip enable signal for the first nonvolatile memory NVM1 before providing/outputting the read enable signal RE. The enabled first nonvolatile memory NVM1 may perform a valid operation in response to the read enable signal RE. However, since the other nonvolatile memories NVM2 to NVM4 are disabled, the transmitted read enable signal RE may be ignored.

Referring to FIG. 8B, the first nonvolatile memory NVM1 may provide/output a data signal DQ and a data strobe signal DQS in response to a read enable (RE) signal. The signals DQ/DQS provided/output by the first nonvolatile memory NVM1 through the way W1 may be transferred to the storage controller and also the other nonvolatile memories NVM2 to NVM4 through the data bus BUS. However, since the other nonvolatile memories NVM2 to NVM4 are disabled, the transferred signals DQ/DQS may be ignored, and the storage controller may effectively receive the signals DQ/DQS.

Figure 8C:
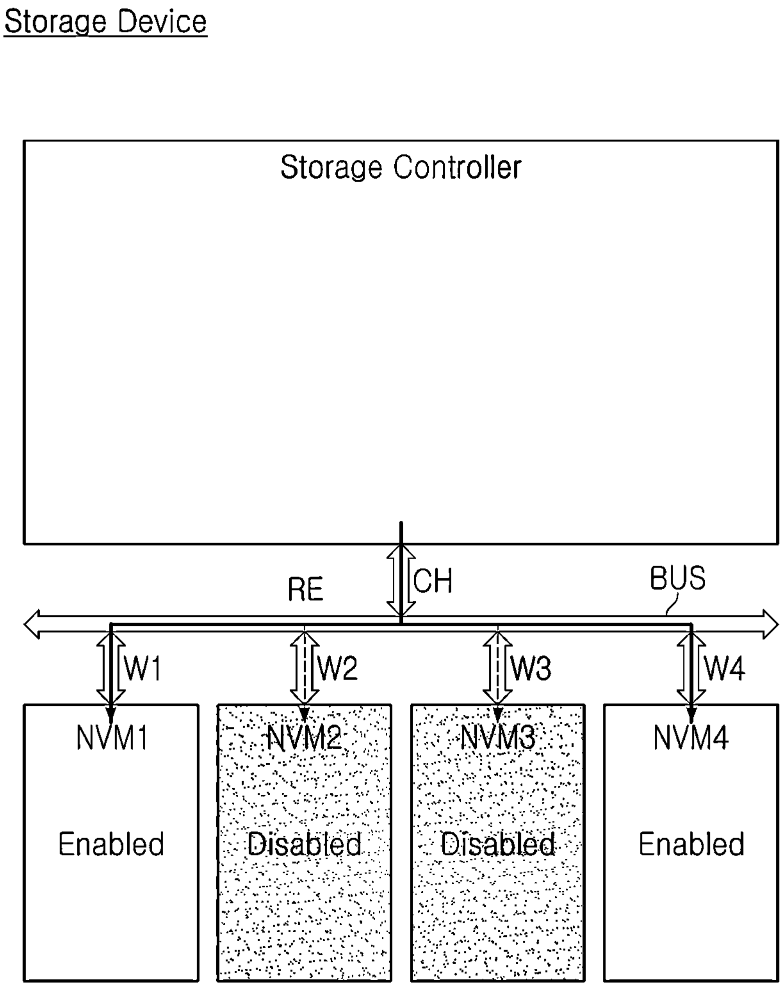
Figure 8D:
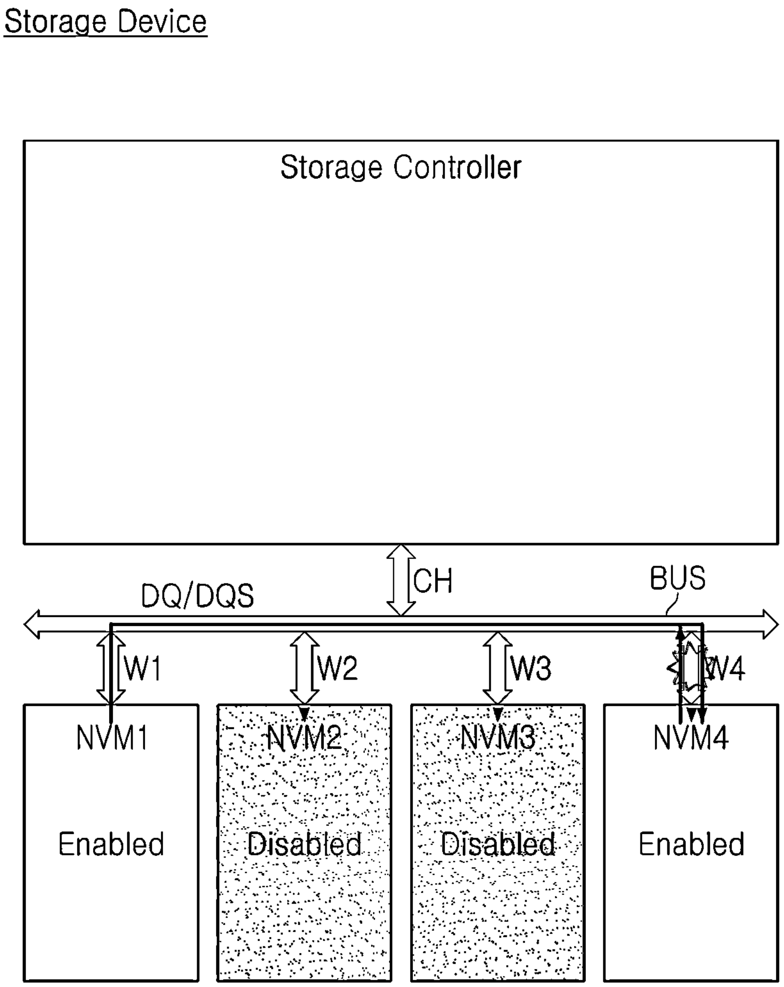

In the storage device according to the comparative example, there may be a limitation in transferring data between the nonvolatile memories without using a storage controller. FIGS. 8C and 8D illustrate an example of such a limitation in transferring data between nonvolatile memories using the example in which data is directly transmitted from the first nonvolatile memory NVM1 to the fourth nonvolatile memory NVM4.

Referring to FIG. 8C, the first nonvolatile memory NVM1 may be enabled to provide/output data, and the fourth nonvolatile memory NVM4 may be enabled to effectively receive data.

The storage controller may provide/output a read enable signal RE through a channel CH. The read enable signal RE reaching the first nonvolatile memory NVM1 may be effectively received, and the read enable signal RE reaching the second and third nonvolatile memories NVM2 and NVM3 may be ignored. The read enable signal RE may also be effectively received by the fourth nonvolatile memory NVM4 enabled to receive data.

Referring to FIG. 8D, the first nonvolatile memory NVM1 may provide/output signals DQ/DQS in response to the read enable signal RE. Signals DQ/DQS provided/output by the first nonvolatile memory NVM1 may reach the fourth nonvolatile memory NVM4 through the data bus BUS.

However, in addition to the fourth nonvolatile memory NVM4 receiving the signals DQ/DQS, the fourth nonvolatile memory NVM4 may also provide/output the signals DQ/DQS in response to the read enable signal RE. Signals provided/output by the first nonvolatile memory NVM1 and signals provide/output by the fourth nonvolatile memory NVM4 may thus collide. Accordingly, the fourth nonvolatile memory NVM4 may not normally receive the signals DQ/DQS provided/output by the first nonvolatile memory NVM1.

In some example embodiments, the storage controller may selectively enable data input or output of the nonvolatile memory. For example, an input-enabled nonvolatile memory may effectively receive a write enable signal WE, but may ignore a read enable signal RE, whereas the output-enabled nonvolatile memory may effectively receive the read enable signal RE, but may ignore the write enable signal WE.

Figure 9A:
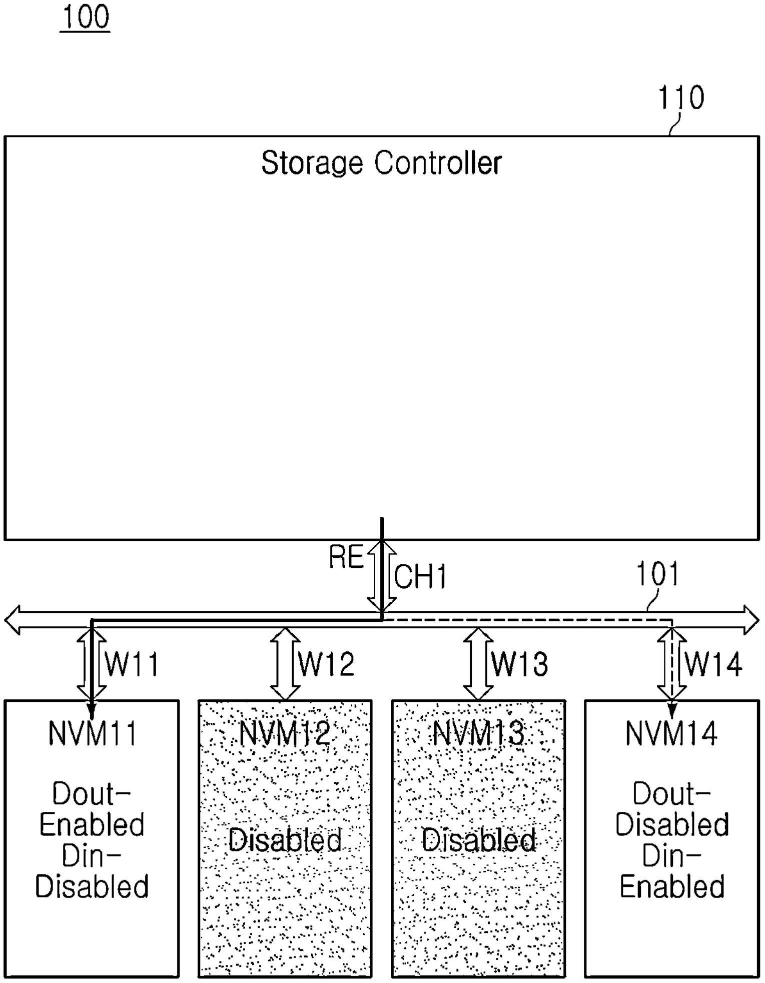
FIGS. 9A and 9B are block diagrams illustrating operations of transmitting and receiving data between nonvolatile memory devices according to example embodiments of the present disclosure.
Figure 9B:
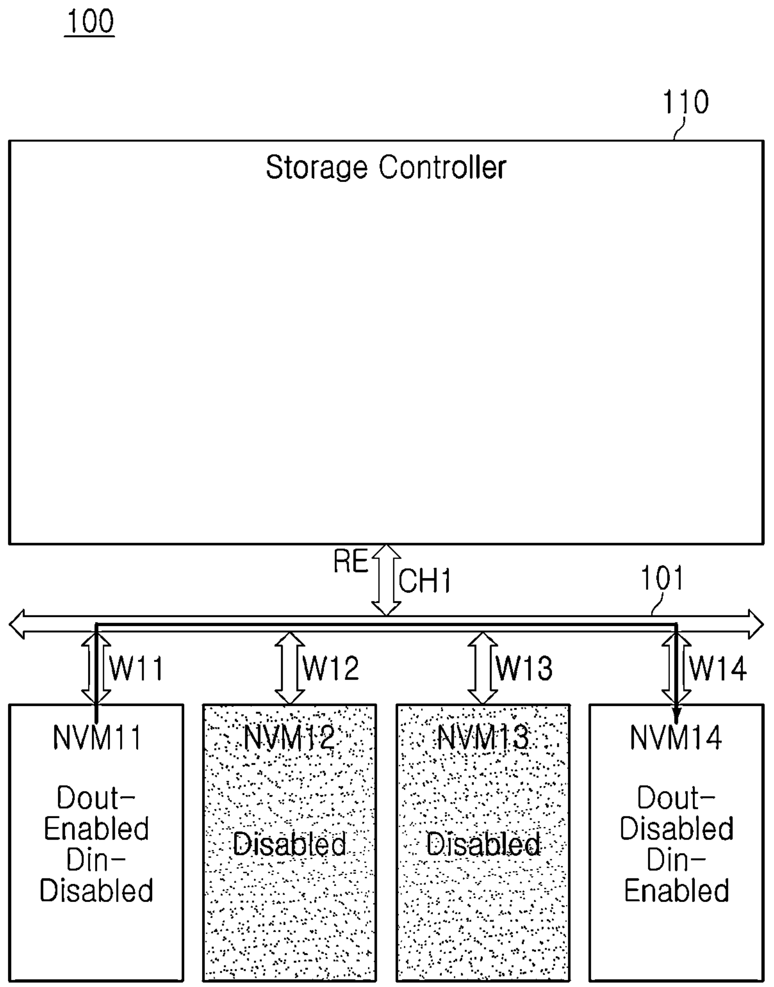

FIGS. 9A and 9B are diagrams illustrating operations of transmitting and receiving data between nonvolatile memories according to some example embodiments. The storage device 100 in FIGS. 9A and 9B may correspond to the storage device 100 described with reference to FIG. 1. Some example embodiments in which data is directly transmitted from the first nonvolatile memory NVM1 to the fourth nonvolatile memory NVM4 will be described with reference to FIGS. 9A and 9B.

Referring to FIG. 9A, the storage controller 110 may enable a data input operation/function of the first nonvolatile memory NVM11 such that data of the first nonvolatile memory NVM11 may be transferred to the fourth nonvolatile memory NVM14, and the storage controller 110 may enable a data input function of the fourth nonvolatile memory NVM14.

The storage controller 110 may provide/output a read enable signal RE through a channel CH1. The read enable signal RE output through the channel CH1 may be transferred to the nonvolatile memories NVM11-NVM14 through the data bus 101. The read enable signal RE may be effectively received by the first nonvolatile memory NVM11 of which an output operation/function is enabled. However, the read enable signal RE may be ignored in the disabled second and third nonvolatile memories NVM2 and NVM3 and the input-enabled fourth nonvolatile memory NVM14.

Referring to FIG. 9B, the first nonvolatile memory NVM11 may provide/output the data signal DQ and the data strobe signal DQS through the way W11 in response to the read enable signal RE. Signals may not be provided/output by the fourth nonvolatile memory NVM14 in which the read enable signal RE is ignored.

The signals DQ/DQS provided/output by the first nonvolatile memory NVM11 may be effectively received by the fourth nonvolatile memory NVM14 for which an input function is enabled, and may be ignored in the disabled second and third nonvolatile memories NVM12 and NVM13. Accordingly, the fourth nonvolatile memory NVM14 may receive the signals DQ/DQS provide/output by the first nonvolatile memory NVM11 through the data bus 101 without using the storage controller 110.

According to the description described with reference to FIGS. 9A and 9B, data may be transmitted between nonvolatile memories without using the storage controller 110. The transfer of data between nonvolatile memories may be controlled by the storage controller 110. For example, a move command specifying a source nonvolatile memory from which stored data is to be transmitted and a destination nonvolatile memory to which the data is to be transmitted may be defined. The storage controller 110 may instruct the memory device 120 to transmit data between nonvolatile memories by providing/outputting a move command similar to transmitting read command and write commands.

In some example embodiments, the storage controller 110 may selectively enable input and output operations/functions of nonvolatile memories, and may allow data to be transmitted between nonvolatile memories without using the storage controller 110. Accordingly, the amount of data input/output between the storage controller 110 and the nonvolatile memories may be reduced, and performance of the storage device 100 may be improved.

The storage controller and the nonvolatile memories may include input/output pins used to transmit and receive an input enable signal and an output enable signal.

Figure 10A:
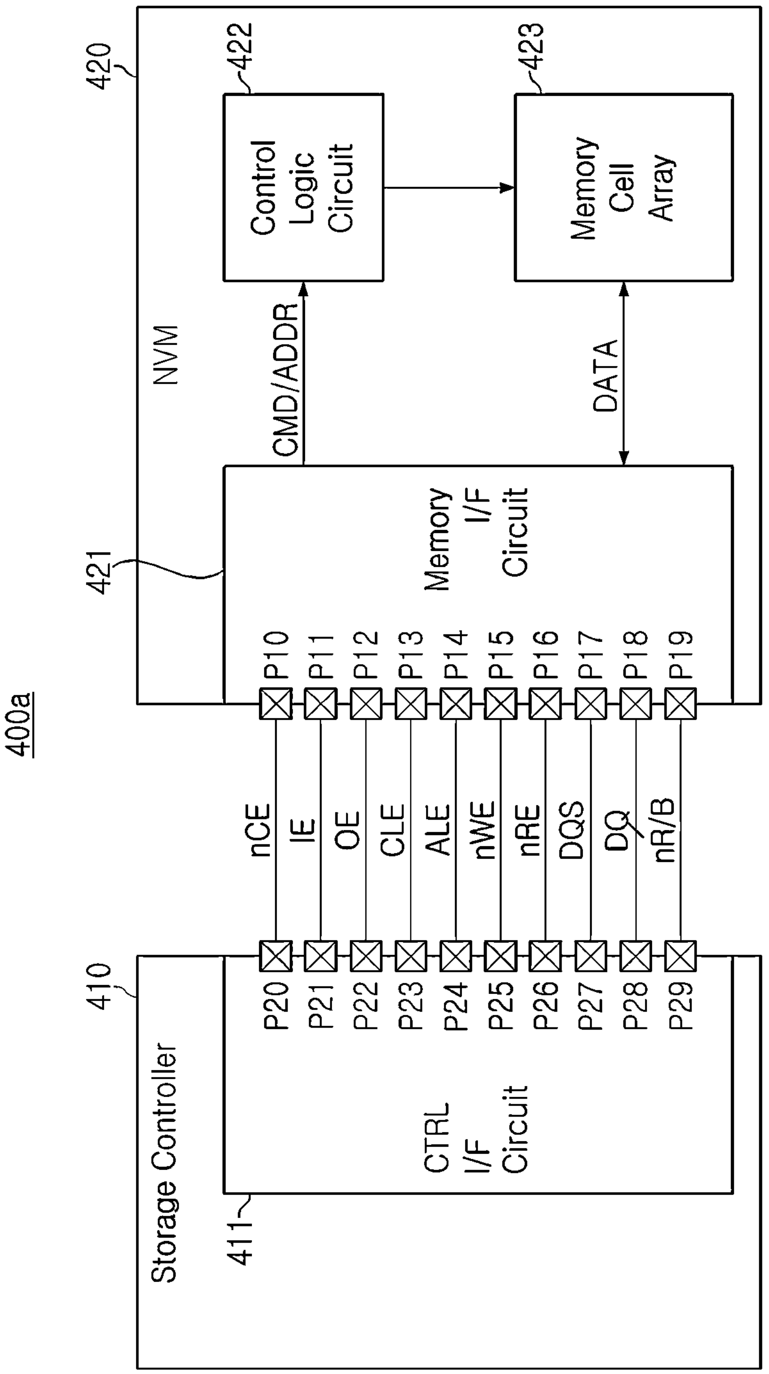
FIGS. 10A to 10B are block diagrams illustrating a storage device according to example embodiments of the present disclosure.
Figure 10B:
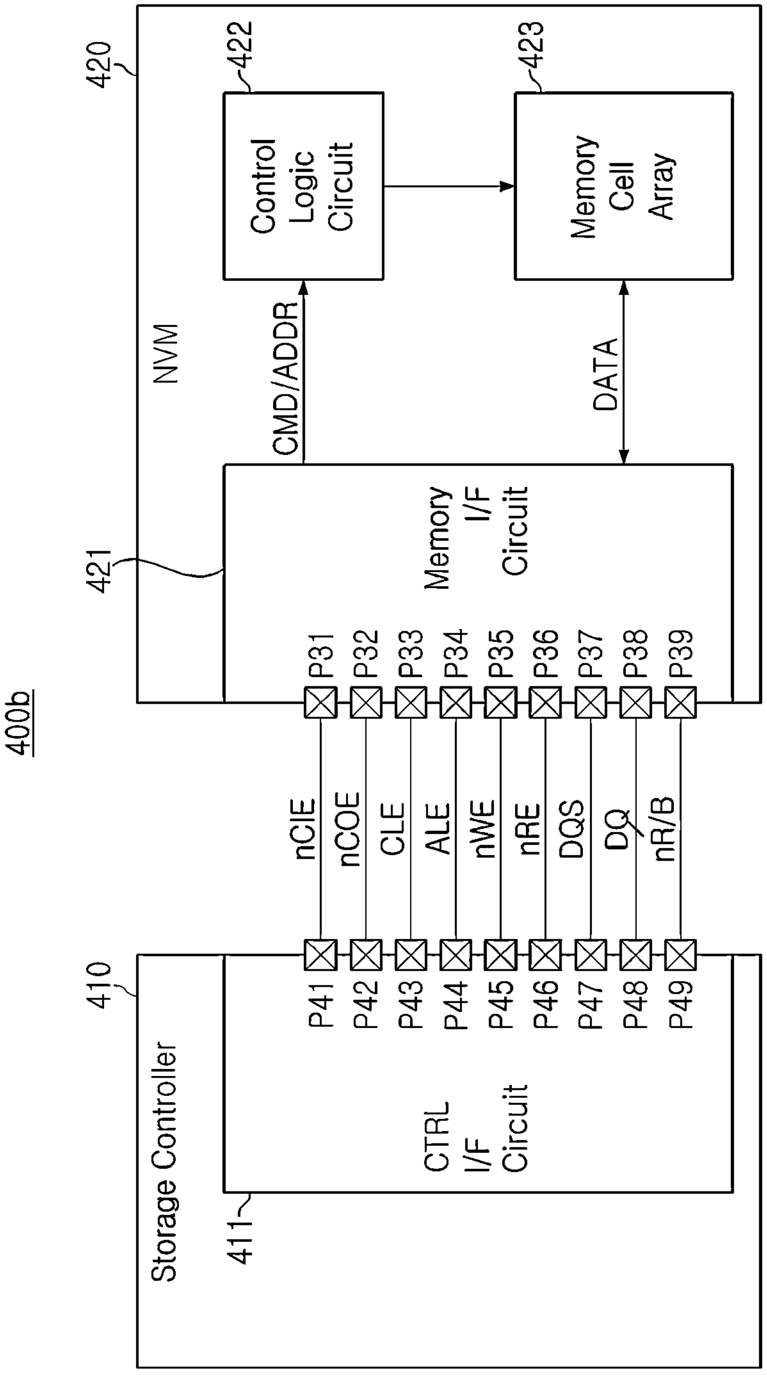

FIGS. 10A and 10B are diagrams illustrating a storage device according to some example embodiments.

FIG. 10A is a block diagram illustrating a storage device **400*a* according to some example embodiments. Referring to FIG. 10A, the storage device 400*a* may include a storage controller 410 and a nonvolatile memory 420. The nonvolatile memory 420** may correspond to one of the nonvolatile memories NVM11-NVM44 communicating with the storage controller based on one of the plurality of channels CH1-

CH4 and/or ways W11-W44 in FIG. 2. The storage controller 410 may correspond to the storage controller 210 in FIG. 2.

The nonvolatile memory 420 may include first to tenth pins P10 to P19, a memory interface circuit 421, a control logic circuit 422, and a memory cell array 423.

The memory interface circuit 421 may receive a chip enable signal nCE, an input enable signal IE, and an output enable signal OE from the storage controller 410 using first to third pins P10 to P12, respectively.

For example, when the chip enable signal nCE is in at enable state (e.g., a logic low level), the input enable signal IE is at an enable state (e.g., a logic high level), and the output enable signal OE is at a disabled state (e.g., a logic low level), the nonvolatile memory 420 may be input-enabled. When the nonvolatile memory 420 is input-enabled, the memory interface circuit 421 may transmit signals to and/or receive signals from the storage controller 410 through the other pins P13-P15 and P17-P19, other than the seventh pin P16 which is used to transmit the read enable signal nRE.

When the chip enable signal nCE is at an enabled state, the input enable signal IE is at a disabled state, and the output enable signal OE is at an enabled state, the nonvolatile memory 420 may be output-enabled. When the nonvolatile memory 420 is output-enabled, the memory interface circuit 421 may transmit signals to and receive signals from storage controller 410 through the other pins P13-P14 and P16-P19, other than the sixth pin P15 which is used to transfer the write enable signal nWE.

The memory interface circuit 421 may receive a command latch enable signal CLE, an address latch enable signal ALE, and a write-enable signal nWE from the storage controller 410 through the fourth to sixth pins P12-P14. The memory interface circuit 421 may receive the data signal DQ from the storage controller 410 or may transmit the data signal DQ to the storage controller 410 through the eighth pin P17. The command CMD, address ADDR, and data DATA may be transferred through the data signal DQ. For example, the data signal DQ may be transmitted through a plurality of data signal lines. In this case, the eighth pin P17 may include a plurality of pins corresponding to the plurality of data signals DQ.

The memory interface circuit 421 may obtain a command CMD from the data signal DQ received during an enable period (e.g., high level state) of the command latch enable signal CLE based on the toggle timings of the write enable signal nWE. The memory interface circuit 421 may obtain the address ADDR from the data signal DQ received during the enable period (e.g., high level state) of the address latch enable signal ALE based on the toggle timings of the write enable signal nWE.

The memory interface circuit 421 may receive the read enable signal nRE from the storage controller 410 through the sixth pin P15. The memory interface circuit 421 may receive the data strobe signal DQS from the storage controller 410 or may transmit the data strobe signal DQS to the storage controller 410 through the sixth pin P16.

During the operation of providing/outputting the data DATA of the memory device 420, the memory interface circuit 421 may receive a read enable signal nRE toggling through the sixth pin P15 before providing/outputting the data DATA. The memory interface circuit 421 may generate a data strobe signal DQS toggling based on toggling of the read enable signal nRE. The memory interface circuit 421 may transmit the data signal DQ including the data DATA based on the toggle timing of the data strobe signal DQS. Accordingly, the data DATA may be transmitted to the storage controller 410 in alignment with the toggle timing of the data strobe signal DQS.

When the data signal DQ including the data DATA is received from the storage controller 410 during an operation of inputting the data DATA of the memory device 420, the memory interface circuit 421 may receive a data strobe signal DQS toggling together with the data DATA from the storage controller 410. The memory interface circuit 421 may obtain data DATA from the data signal DQ based on the toggle timing of the data strobe signal DQS.

The memory interface circuit 421 may transmit the ready/busy output signal nR/B to the storage controller 410 through the ninth pin P18. The memory interface circuit 421 may transmit state information of the nonvolatile memory 420 to the storage controller 410 through the ready/busy output signal nR/B.

The control logic circuit 422 may control various operations of the nonvolatile memory 420. The control logic circuit 422 may correspond to the control logic circuit 320 described with reference to FIG. 4.

The memory cell array 423 may store data DATA obtained from the memory interface circuit 421 under control of the control logic circuit 422. The memory cell array 423 may provide/output stored data DATA to the memory interface circuit 421 under control of the control logic circuit 422.

The storage controller 410 may include first to tenth pins P20 to P29 and a controller interface circuit 411. The first to tenth pins P20 to P29 may correspond to the first to tenth pins P10 to P19 of the nonvolatile memory 420.

FIG. 10B is a block diagram illustrating a storage device 400*b* according to some example embodiments. Referring to FIG. 10B, the storage device 400*b* may have substantially the same components as those of the storage device 400*a* other than a portion of pins. Hereinafter, the same descriptions of the storage device 400*a* and the storage device 400*b* may be abridged and/or omitted for the sake of conciseness.

The nonvolatile memory 420 may include first to ninth pins P31-P39. The third to ninth pins P33 to P39 may correspond to the fourth to tenth pins P13-P19 described with reference to FIG. 10A. The memory interface circuit 421 may receive the chip input enable signal nCIE from the storage controller 410 through a first pin P31 and may receive the output enable signal nCOE from the storage controller 410 through a second pin P32.

For example, when the chip input enable signal nCIE is in an enabled state (e.g., a low level), the nonvolatile memory 420 may be input-enabled, and when the chip output enable signal nCOE is in an enabled state (e.g., a low level), the nonvolatile memory may be output-enabled.

The storage controller 410 may include first to ninth pins P41-P49. The third to ninth pins P43 to P49 may correspond to the fourth to tenth pins P23-P29 described with reference to FIG. 10A. The storage controller 410 may input-enable the nonvolatile memory 420 by providing/outputting the chip input enable signal nCIE to the nonvolatile memory 420 through the first pin P41 and may output-enable the nonvolatile memory 420 by providing/outputting the chip output enable signal nCOE to the nonvolatile memory 420 through the second pin P42.

FIGS. 1 to 10B illustrate examples in which a stripe may be striped within nonvolatile memories sharing a channel, and each nonvolatile memory may include a plane. However, some example embodiments thereof are not limited thereto. For example, a stripe may be stored throughout a plurality of planes when each nonvolatile memory includes a plurality of planes, and a stripe may be stored throughout nonvolatile memories coupled to each of a plurality of channels. Hereinafter, operations of updating a stripe of a storage device according to various example embodiments will be described with reference to FIGS. 11 to 12C.

Figure 11:
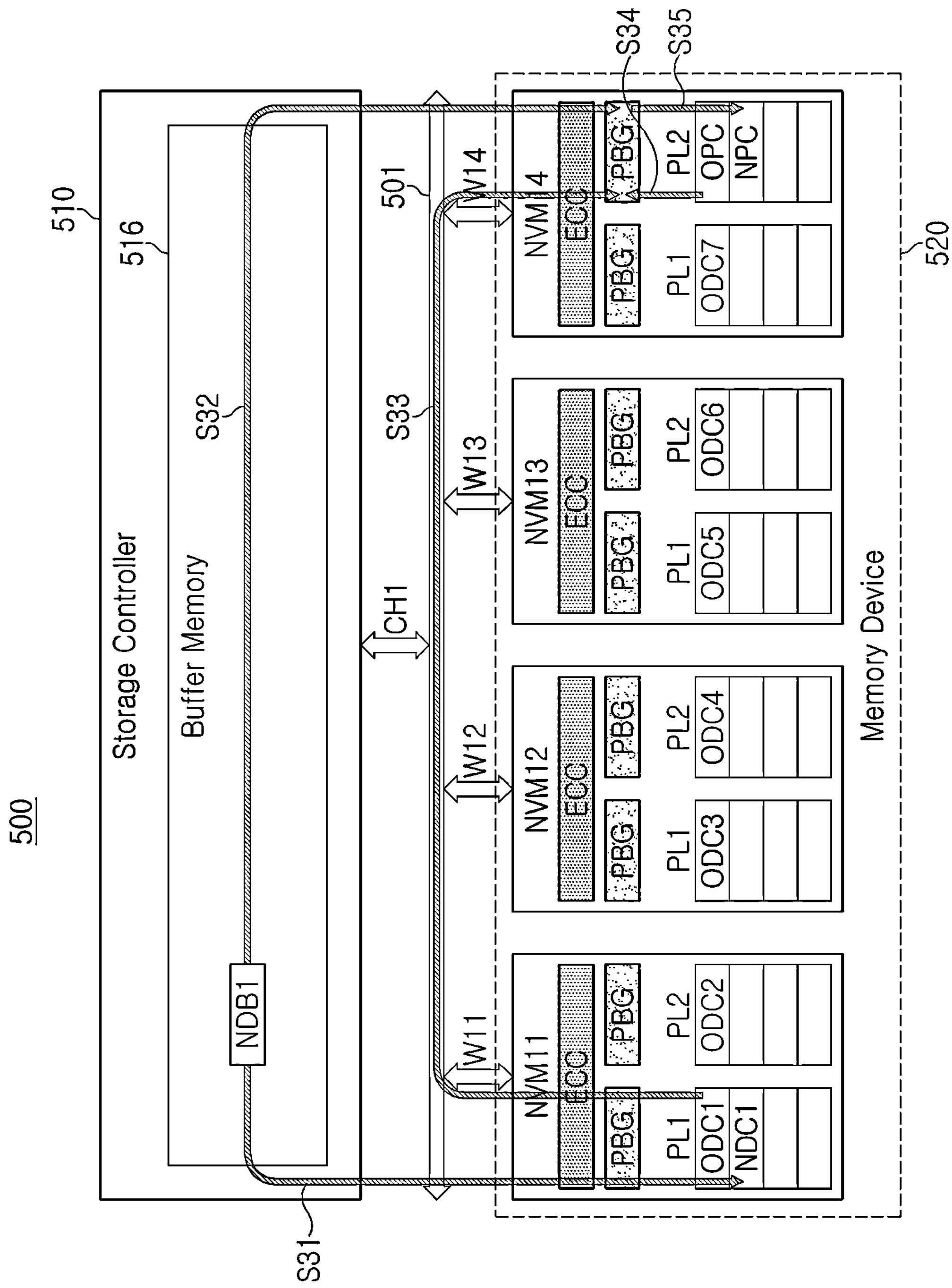
FIG. 11 is a diagram illustrating operations of updating a stripe of a storage device according to example embodiments of the present disclosure.

FIG. 11 is a diagram illustrating operations of updating a stripe of a storage device according to some example embodiments.

Referring to FIG. 11, the storage device 500 may include a storage controller 510, a memory device 520, and a data bus 501. The storage controller 510 may include a buffer memory 516 configured to buffer data to be stored in the memory device 520 and/or to buffer data output by the memory device 520. The storage controller 510 may be connected to the data bus 501 through a channel CH1 to transmit signals to and receive signals from the memory device 520.

The memory device 520 may include a plurality of nonvolatile memories NVM11-NVM14. The plurality of nonvolatile memories NVM11-NVM14 may be connected to the data bus 501 through ways W11-W14 to transmit data to and receive data from the storage controller 510. Each of the plurality of nonvolatile memories NVM11-NVM14 may include a plurality of planes PL1 and PL2. The planes PL1 and PL2 included in a nonvolatile memory may perform program and read operations in parallel with each other.

The storage controller 510 may store a stripe throughout a plurality of planes PL1 and PL2 included in the nonvolatile memories NVM11-NVM14. For example, when the size of data received from the host corresponds to 7 data blocks, the storage controller 510 may generate a parity block by performing a parity operation on each of the 7 data blocks. The storage controller 510 may distribute 7 data blocks and a parity block to nonvolatile memories NVM11-NVM14. Each of the nonvolatile memories NVM11-NVM14 may generate a data chunk or a parity chunk by performing an ECC encoding operation on the data block or parity block, and may program the data chunk or the parity chunk to the plurality of planes PL1 and PL2.

FIG. 11 illustrates an example of a state in which existing data chunks ODC1-ODC7 and existing parity chunk OPC included in a stripe may be stored throughout planes PL1 and PL2 of the nonvolatile memories NVM11-NVM14.

When a new data block NDB1 of a data block included in an existing data chunk ODC1 is received from the host, the storage device 500 may update the parity chunk as discussed with respect to operations S31 to S34.

In operation S31, the storage controller 510 may provide the new data block NDB1 buffered in the buffer memory 516 to the first nonvolatile memory NVM11 in which the existing data chunk ODC1 is stored. The first nonvolatile memory NVM11 may generate a new data chunk NDC1 by adding parity bits to the new data block NDB1 using an ECC logic circuit, and may buffer the generated data chunk NDC1 in the page buffer group PBG associated with the first plane PL1. The first nonvolatile memory NVM11 may program the new data chunk NDC1 to the first plane PL1.

In operation S32, the storage controller 510 may provide the new data block NDB1 to the fourth nonvolatile memory NVM14 in which the existing parity chunk OPC is stored. The fourth nonvolatile memory NVM14 may generate a new data chunk NDC1 using an ECC logic circuit and may buffer the generated data chunk NDC1 in the page buffer group PBG associated with the second plane PL2.

In operation S33, the first nonvolatile memory NVM11 may read the existing data chunk ODC1 from the first plane PL1, and may provide the existing data chunk ODC1 to the fourth nonvolatile memory NVM14 using the bus 501 (e.g., without using storage controller 510).

In operation S34, the fourth nonvolatile memory NVM14 may read the existing parity chunk OPC from the second plane PL2 and may buffer the existing parity chunk OPC in the page buffer group PBG. The fourth nonvolatile memory NVM14 may generate a new parity chunk NPC by performing a parity operation on the existing data chunk ODC1, the existing parity chunk OPC, and the new data chunk NDC1. In operation S35, the fourth nonvolatile memory NVM14 may complete the updating of the stripe by programming the new parity chunk NPC into the second plane PL2.

Figure 12A:
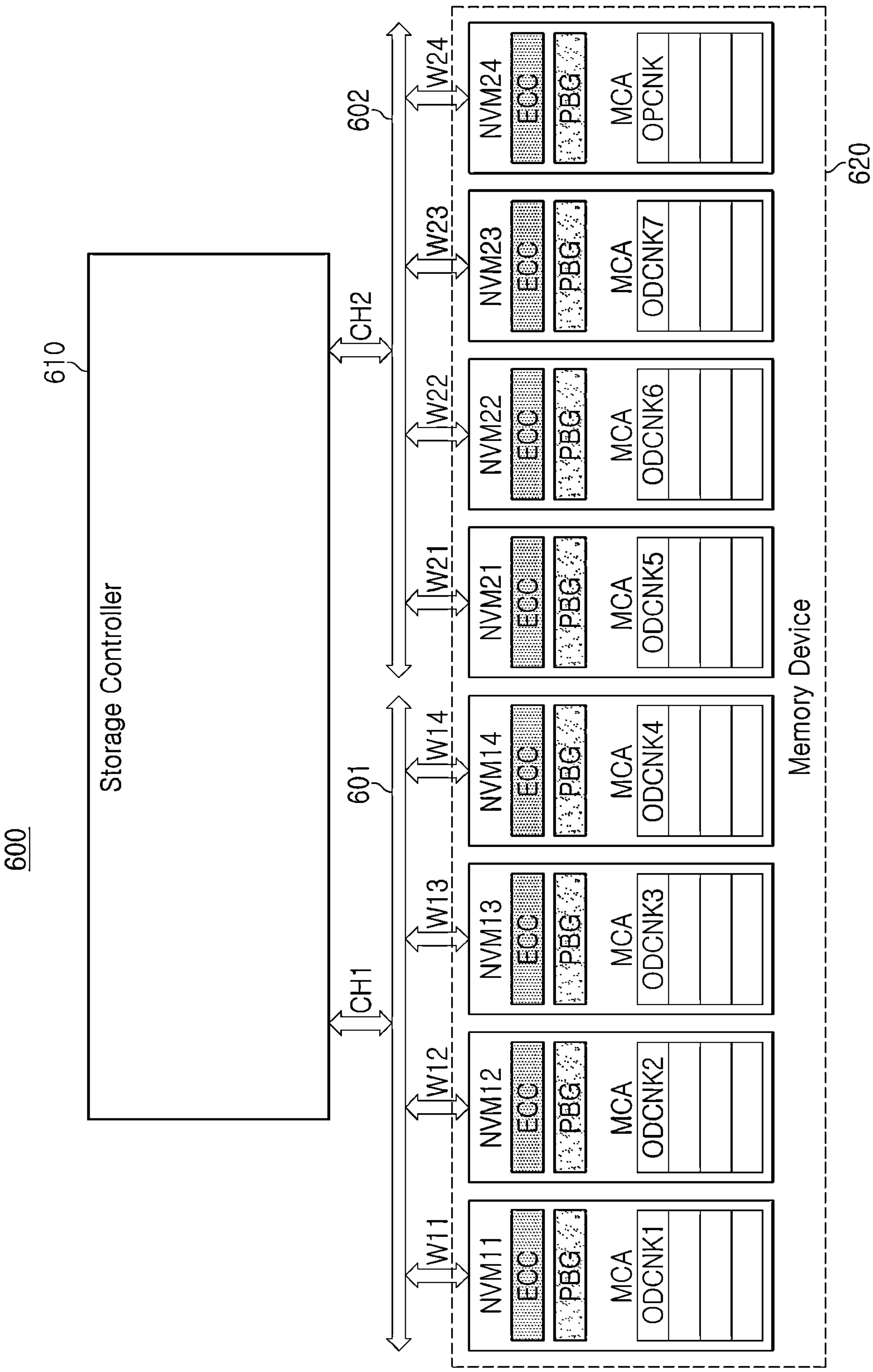
FIGS. 12A to 12C are diagrams illustrating operations of updating a stripe of a storage device according to example embodiments of the present disclosure.
Figure 12B:
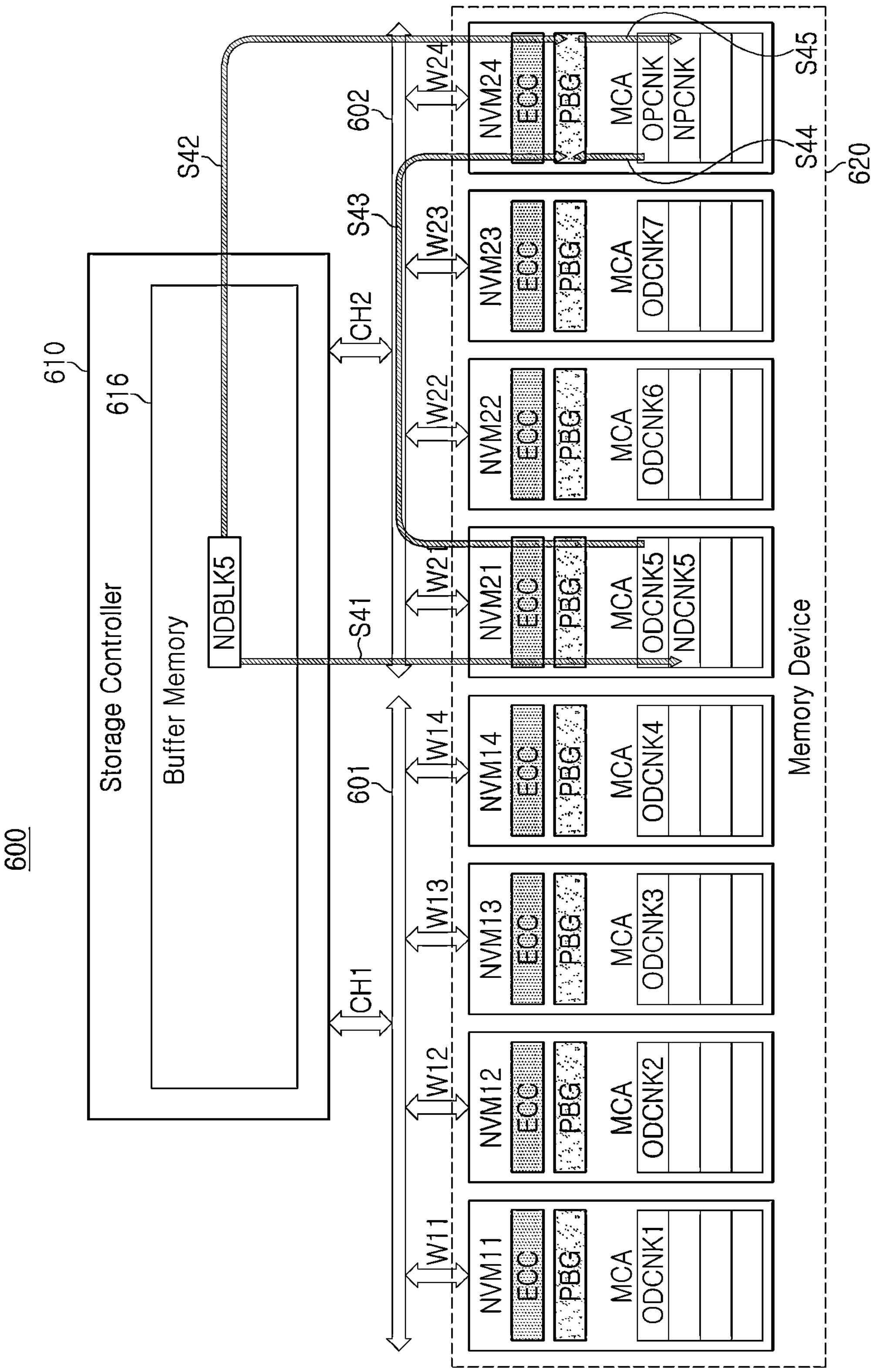
Figure 12C:
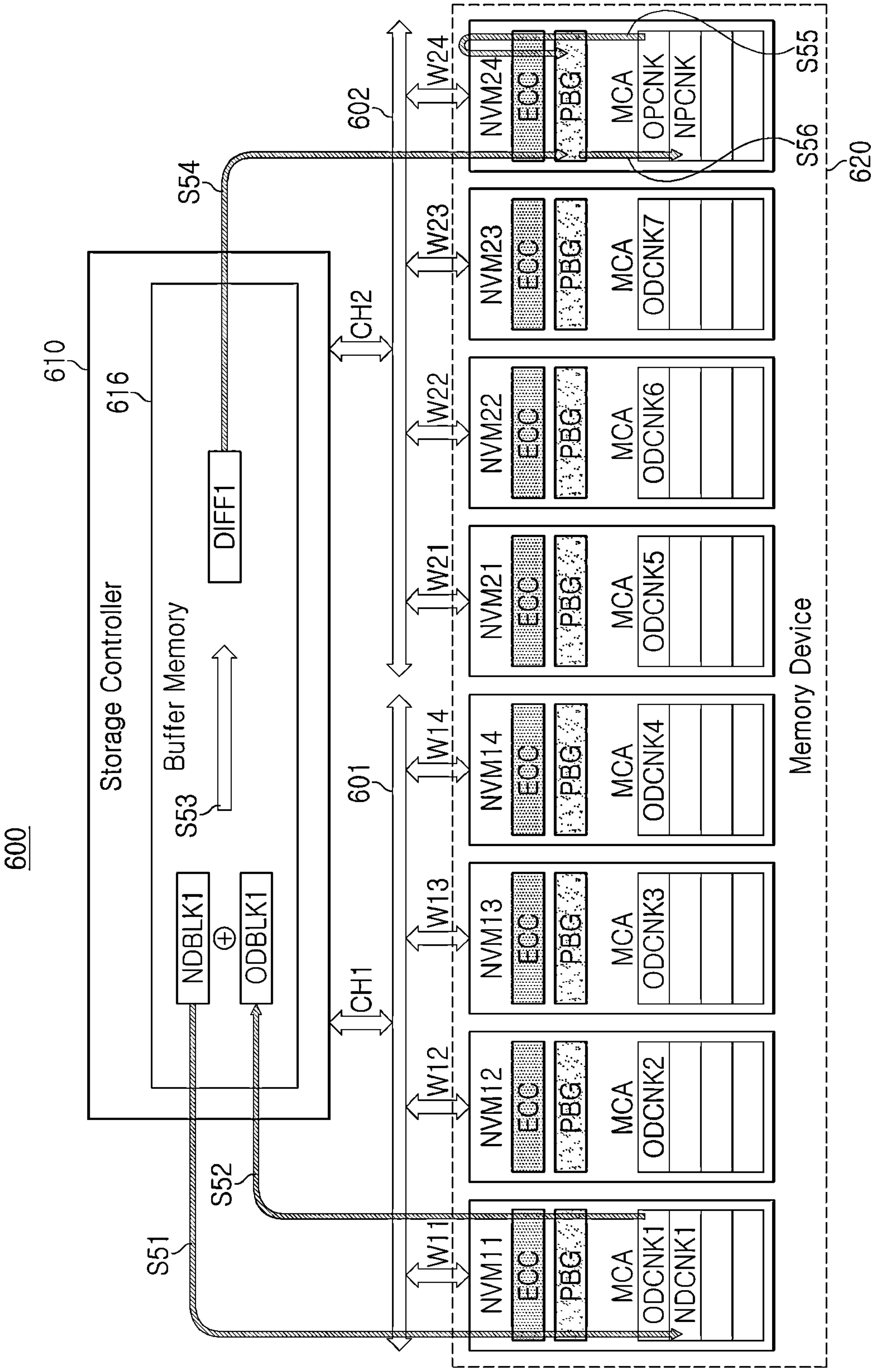

FIGS. 12A to 12C are diagrams illustrating operations of updating a stripe of a storage device according to some example embodiments.

Referring to FIG. 12A, a storage device 600 may include a storage controller 610, a memory device 620, and a plurality of data buses 601 and 602. The memory device 620 may include a plurality of nonvolatile memories NVM11-NVM24. The storage controller 610 may transmit signals to and receive signals from the nonvolatile memories NVM11-NVM14 through the first data bus 601 connected to the first channel CH1, and may transmit signals to and receive signals from the nonvolatile memories NVM21 to NVM24 through the second data bus 602 connected to the second channel CH2.

The storage controller 610 may store a stripe throughout the nonvolatile memories NVM11-NVM24 connected to the plurality of channels CH1 and CH2. FIG. 12A illustrates the example of the state in which a plurality of existing data chunks ODCNK1 to ODCNK7 and a parity chunk OPCNK are stored throughout the nonvolatile memories NVM11-NVM24.

In some example embodiments, when a data chunk stored in a nonvolatile memory connected to the same data bus 602 as the nonvolatile memory NVM24 in which the existing parity chunk OPCNK is stored is updated, the nonvolatile memory NVM24 may obtain the existing data chunk without using the storage controller 610, and may update the parity chunk using the obtained existing data chunk.

Referring to FIG. 12B, the storage device 600 may update the parity chunk throughout operations S41 to S45.

In operation S41, the storage controller 610 may transfer the new data block NDBLK5 buffered in the buffer memory 616 to the nonvolatile memory NVM21 in which the existing data chunk ODCNK5 corresponding to the new data block NDBLK5 is stored. The nonvolatile memory NVM21 may generate a new data chunk NDCNK5 by adding a parity bit to the new data block NDBLK5 and may program the new data chunk NDCNK5 into the memory cell array MCA.

In operation S42, the storage controller 610 may provide the new data block NDBLK5 to the nonvolatile memory NVM24 in which the existing parity chunk OPCNK is stored. The nonvolatile memory NVM24 may generate a new data chunk NDCNK5 and may buffer the generated data chunk NDCNK5 in the page buffer group PBG.

In operation S43, the nonvolatile memory NVM24 may obtain the existing data chunk ODCNK5 from the nonvolatile memory NVM21. Since the nonvolatile memories NVM21 and NVM24 share the same data bus 602, the nonvolatile memory NVM21 may transmit the existing data chunk ODCNK5 to the nonvolatile memory NVM24 without using the storage controller 610.

In operation S44, the nonvolatile memory NVM24 may load the existing parity chunk OPCNK into the page buffer group PBG. The nonvolatile memory NVM24 may generate a new parity chunk NPCNK by performing a parity operation on the existing data chunk ODCNK5, the existing parity chunk OPCNK, and the new data chunk NDCNK5. In operation S45, the nonvolatile memory NVM24 may program the new parity chunk NPCNK into the memory cell array MCA.

In some example embodiments, when an existing data chunk stored in a nonvolatile memory connected to a data bus 601 different from that of the nonvolatile memory NVM24 is updated, the nonvolatile memory NVM24 may obtain data useful/necessary to update of the parity chunk through the storage controller 610, and may update the parity chunk by performing a parity operation on the existing parity chunk OPCNK and the data.

Referring to FIG. 12C, the storage device 600 may update the parity chunk throughout operations S51 to S56.

In operation S51, the storage controller 610 may provide the new data block NDBLK1 buffered in the buffer memory 616 to the nonvolatile memory NVM11 in which the existing data chunk ODCNK1 corresponding to the new data block NDBLK1 is stored. The nonvolatile memory NVM11 may generate a new data chunk NDCNK1 by adding a parity bit to the new data block NDBLK1 and may program the new data chunk NDCNK1 into the memory cell array MCA.

In operation S52, the storage controller 610 may obtain the existing data block ODBLK1 from the nonvolatile memory NVM11. Specifically, the nonvolatile memory NVM11 may, by correcting an error of the existing data chunk ODCNK1 stored in the memory cell array MCA using an ECC logic circuit, obtain the error-corrected existing data block ODBLK1, and may provide/output the existing data block ODCNK1 to the storage controller 610.

In operation S53, the storage controller 610 may generate difference data DIFF1 between the new data block NDBLK1 and the existing data block ODBLK1 by performing an XOR operation on the new data block NDBLK1 and the existing data block ODBLK1.

In operation S54, the storage controller 610 may provide the difference data DIFF1 to the nonvolatile memory NVM24. The nonvolatile memory NVM24 may buffer the difference data DIFF1 in the page buffer group PBG.

In operation S55, the nonvolatile memory NVM24 may load the existing parity chunk OPCNK into the page buffer group PBG. The nonvolatile memory NVM24 may correct an error of the existing parity chunk OPCNK using an ECC logic circuit. The nonvolatile memory NVM24 may generate a new parity chunk NPCNK by performing an XOR operation on the error-corrected existing parity chunk OPCNK and the difference data DIFF1.

In operation S56, the nonvolatile memory NVM24 may complete the updating of the parity chunk by programming a new parity chunk into the memory cell array MCA.

In some example embodiments, since the storage device 600 may transmit data between the nonvolatile memories connected to the same data bus without using the storage controller 610, the amount of data input/output used to update the parity chunk and the amount of buffer memory 616 used may be reduced. Also, even when the updated data chunk and the parity chunk are stored in the nonvolatile memories connected to different data buses, the storage device 600 may offload a portion of parity operations to the nonvolatile memory, thereby reducing the amount of data input/output used to update the parity chunk and the amount of use of the buffer memory 616. Accordingly, performance of the storage device 600 may be improved.

According to the aforementioned example embodiments, the storage device may, by performing a parity operation in the nonvolatile memory storing the parity block, reduce consumption of buffer memory resources of the storage controller.

Also, the storage device may perform moving of data between nonvolatile memories without using a storage controller, such that resource consumption may be reduced when moving data between nonvolatile memories.

While example embodiments have been illustrated and described above, it will be apparent to those skilled in the art that modifications and variations could be made without departing from the scope of the present disclosure as defined by the appended claims.

What is claimed is:

1. A storage device, comprising:
- a plurality of nonvolatile memory devices;
- a storage controller configured to control the plurality of nonvolatile memory devices; and
- a data bus configured to transfer signals between the plurality of nonvolatile memory devices and the storage controller,
- wherein the storage controller is configured to enable a data output operation of a source nonvolatile memory device among the plurality of nonvolatile memory devices, to enable a data input operation of a destination nonvolatile memory device among the plurality of nonvolatile memory devices, and to transmit a read enable signal to the data bus,
- wherein the source nonvolatile memory device is configured to transmit data stored therein to the data bus in response to the read enable signal, and
- wherein the destination nonvolatile memory device is configured to ignore the read enable signal and to obtain the data transmitted by the source nonvolatile memory device to the data bus.

2. The storage device of claim 1, wherein the data transmitted to the data bus is input directly to the destination nonvolatile memory device.

3. The storage device of claim 1,
- wherein the storage controller includes a data buffer configured to buffer data to be stored in the plurality of nonvolatile memory devices and/or data read from the plurality of nonvolatile memory devices, and
- wherein data transmitted to the data bus is received by the destination nonvolatile memory device without being buffered in the data buffer.

4. The storage device of claim 1, wherein the storage controller is configured to enable the data output operation of the source nonvolatile memory device using a move command designating the source nonvolatile memory device and the destination nonvolatile memory device, to enable the data input operation of the destination nonvolatile memory device, and to control the data output operation of the source nonvolatile memory device and the data input operation of the destination nonvolatile memory device.

5. The storage device of claim 1, wherein the storage controller is configured to receive a plurality of data blocks from a host, to generate a parity block by performing a parity operation on the plurality of data blocks, and to control the plurality of nonvolatile memory devices such that the plurality of data blocks and the parity block are stored in respective ones of the plurality of nonvolatile memory devices including the source nonvolatile memory device and the destination nonvolatile memory device.

6. The storage device of claim 5, wherein the storage controller is configured to receive a new data block from the host, to identify one of the plurality of nonvolatile memory devices in which an existing data chunk corresponding to the new data block is stored as the source nonvolatile memory device, to identify one of the plurality of nonvolatile memory devices in which an existing parity block included in the same stripe as the existing data chunk is stored as the destination nonvolatile memory device, and to control the source nonvolatile memory device to move the existing data chunk to the destination nonvolatile memory device through the data bus.

7. The storage device of claim 1, wherein the storage controller includes a first plurality of pins configured to output a chip enable signal, an output-enable signal, and an input-enable signal, wherein each of the plurality of nonvolatile memory devices includes a respective second plurality of pins configured to receive a chip enable signal, an output-enable signal, and an input-enable signal, and wherein the storage controller is configured to enable an output operation by enabling a chip enable signal and an output-enable signal of the source nonvolatile memory device, and to enable an input operation by enabling a chip enable signal and an input-enable signal of the destination nonvolatile memory device.

8. The storage device of claim 1, wherein the storage controller includes a first plurality of pins configured to output a chip output-enable signal and a chip input-enable signal, and wherein each of the plurality of nonvolatile memory devices includes a respective second plurality of pins configured to receive a chip output-enable signal and a chip input-enable signal.

9. An operation method of a storage device, comprising:

enabling a data output operation of a source nonvolatile memory device;

enabling a data input operation of a destination nonvolatile memory device;

transmitting a read enable signal to a data bus which is configured to transfer signals between the source nonvolatile memory device and the destination nonvolatile memory device;

transmitting, by the source nonvolatile memory device, data stored therein to the data bus in response to the read enable signal;

ignoring, by the destination nonvolatile memory device, the read enable signal; and obtaining, by the destination nonvolatile memory device, the data transmitted by the source nonvolatile memory device to the data bus.

10. The operation method of claim 9, wherein the data transmitted to the data bus is received by the destination nonvolatile memory device without using the storage controller.

11. The operation method of claim 9, wherein the data transmitted to the data bus is input to the destination nonvolatile memory device, without being buffered in a data buffer outside the source nonvolatile memory device and the destination nonvolatile memory device.

12. The operation method of claim 9, further comprising:

receiving a plurality of data blocks from a host;

generating a parity block by performing a parity operation on the plurality of data blocks; and controlling a plurality of nonvolatile memory devices including the source nonvolatile memory device and the destination nonvolatile memory device, such that the plurality of data blocks and the parity block are stored in respective ones of the plurality of nonvolatile memory devices.

13. The operation method of claim 12, further comprising:

receiving a new data block from the host;

identifying one of the plurality of nonvolatile memory devices in which an existing data chunk corresponding to the new data block is stored as the source nonvolatile memory device;

identifying one of the plurality of nonvolatile memory devices in which an existing parity block included in the same stripe as the existing data chunk is stored as the destination nonvolatile memory device; and controlling the source nonvolatile memory device to move the existing data chunk to the destination nonvolatile memory device through the data bus.

14. The operation method of claim 9, further comprising:

performing, by the source nonvolatile memory device, a computational operation on first data stored therein and second data received from the data bus; and wherein the transmitting data stored therein to the data bus in response to the read enable signal includes transmitting result data generated by the computational operation.

15. The operation method of claim 14, wherein the computational operation is performed without buffering the first data and the second data into a buffer memory outside the source nonvolatile memory device.

16. A storage device, comprising:

a plurality of nonvolatile memory devices;

a storage controller configured to control the plurality of nonvolatile memory devices; and a data bus configured to transfer signals between the plurality of nonvolatile memory devices and the storage controller, wherein the storage controller is configured to enable a data output operation of a source nonvolatile memory device among the plurality of nonvolatile memory devices, to enable a data input operation of a destination nonvolatile memory device among the plurality of nonvolatile memory devices, and to transmit a read enable signal to the data bus, wherein the source nonvolatile memory device is configured to perform a computational operation on at least data stored therein and transmit result data generated by the computational operation in response to the read enable signal, and wherein the destination nonvolatile memory device is configured to ignore the read enable signal and to obtain the result data transmitted by the source nonvolatile memory device to the data bus.

17. The storage device of claim 16, wherein the source nonvolatile memory device is configured to perform the computational operation on a first data stored therein and a second data received from the storage controller.

18. The storage device of claim 17, wherein the computational operation includes operations for comparing the first data and the second data, and generating the result data indicating a difference of the first data and the second data.

19. The storage device of claim 17, wherein the storage controller includes a data buffer configured to buffer data to be stored in the plurality of nonvolatile memory devices and/or data read from the plurality of nonvolatile memory devices, and wherein the source nonvolatile memory device is configured to perform the computational operation on the first and second data without being buffered in the data buffer.

20. The storage device of claim 16, wherein the destination nonvolatile memory device is configured to perform the computational operation on the result data and third data stored therein, and store fourth data generated by the computational operation.

* * * * *